(12) United States Patent
Johnsen

(10) Patent No.: US 12,638,086 B2
(45) Date of Patent: May 26, 2026

(54) ROTARY VALVE

(71) Applicant: CARMO HOLDING APS, Espergærde (DK)

(72) Inventor: Anders Johnsen, Klagshamn (SE)

(73) Assignee: Carmo Holdings APS (DK)

( * ) Notice: Subject to any disclaimer, the term of this patent is extended or adjusted under 35 U.S.C. 154(b) by 26 days.

(21) Appl. No.: 17/998,028

(22) PCT Filed: May 10, 2021

(86) PCT No.: PCT/DK2021/050148
§ 371 (c)(1),
(2) Date: Nov. 4, 2022

(87) PCT Pub. No.: WO2021/228340
PCT Pub. Date: Nov. 18, 2021

(65) Prior Publication Data
US 2023/0167911 A1      Jun. 1, 2023

(30) Foreign Application Priority Data

May 11, 2020 (WO) ................ PCT/DK2020/050136

(51) Int. Cl.
*F16K 5/04* (2006.01)
*F16K 31/60* (2006.01)
(Continued)

(52) U.S. Cl.
CPC .......... *F16K 5/0457* (2013.01); *F16K 5/0464* (2013.01); *F16K 5/0478* (2013.01);
(Continued)

(58) Field of Classification Search
CPC .... F16K 5/0457; F16K 5/0464; F16K 5/0478; F16K 31/602; B29C 45/16;
(Continued)

(56) References Cited

U.S. PATENT DOCUMENTS 2,547,116 A * 4/1951 Gould ..................... F16K 35/04
251/297
2,781,547 A * 2/1957 Moxness ............... B29C 45/572
264/327
(Continued)

FOREIGN PATENT DOCUMENTS

EP        0768099 A1    4/1997
WO    2018035219 A1    2/2018

OTHER PUBLICATIONS

PCT International Search Report, mailed Nov. 19, 2021, in connection with International Application No. PCT/DK2021/050148, all pages.
(Continued)

*Primary Examiner* — Craig M Schneider
*Assistant Examiner* — Andrew J Rost
(74) *Attorney, Agent, or Firm* — Foley IP Law, PLLC

(57) ABSTRACT

A two-component rotary valve for controlling the fluid flow through a fluid conduit, the rotary valve being injection-moulded in two steps with no need for assembly after the injection moulding procedure. The rotary valve comprises a valve house with a plug inside it, and the rotary valve has sealing means in the form of local variations in the radius of the plug and house along their lengths. Thereby, a rotary valve is obtained which does not require a viscous sealant, such as silicone, to eliminate the risk of leakage, when the valve is open.

11 Claims, 13 Drawing Sheets

(51) Int. Cl.
  *B29C 45/16* (2006.01)
  *B29L 31/00* (2006.01)

(52) U.S. Cl.
  CPC ............ F16K 31/602 (2013.01); *B29C 45/16*
    (2013.01); *B29L 2031/7506* (2013.01)

(58) Field of Classification Search
  CPC ......... B29C 45/0017; B29C 2045/002; B29C
    2045/1665; B29L 2031/7506; A61M
    2039/229; A61M 39/22
  USPC ........................................ 251/208, 209, 309
  See application file for complete search history.

(56) References Cited

U.S. PATENT DOCUMENTS

| | | | |
|---|---|---|---|
| 3,945,603 A | | 3/1976 | Fraser |
| 4,230,128 A | * | 10/1980 | Aramayo ......... A61B 5/150221 |
| | | | 600/576 |
| 4,282,873 A | * | 8/1981 | Roth ................... A61M 3/0229 |
| | | | 604/32 |
| 4,314,586 A | | 2/1982 | Folkman |
| 4,789,000 A | * | 12/1988 | Aslanian ........... A61M 5/16881 |
| | | | 604/32 |
| 4,807,666 A | | 2/1989 | Morse |
| 5,027,981 A | * | 7/1991 | Magister .............. B65D 81/325 |
| | | | 222/137 |
| 5,043,126 A | * | 8/1991 | Thurau ............... B29C 45/0017 |
| | | | 264/255 |
| 5,110,086 A | * | 5/1992 | Meuleman ............. A01G 25/16 |
| | | | 251/118 |
| 5,203,769 A | * | 4/1993 | Clement ............. A61M 39/223 |
| | | | 604/35 |
| 5,901,945 A | * | 5/1999 | Schalk .................. F16K 5/0478 |
| | | | 251/309 |
| 6,371,444 B1 | | 4/2002 | Jahn et al. |
| 6,536,688 B1 | * | 3/2003 | Chun-Lee .............. B05B 15/00 |
| | | | 239/525 |
| 6,880,808 B2 | * | 4/2005 | McPeak .................. F16K 5/045 |
| | | | 251/312 |
| 10,371,268 B2 | | 8/2019 | Peirsman et al. |
| 10,736,710 B2 | * | 8/2020 | Thomas ............... A61C 17/125 |
| 2006/0033066 A1 | | 2/2006 | Carrez et al. |
| 2006/0163515 A1 | | 7/2006 | Ruschke |
| 2022/0112967 A1 | * | 4/2022 | Peery .................. F16K 99/0032 |

OTHER PUBLICATIONS

PCT Written Opinion, mailed Nov. 19, 2021, in connection with
International Application No. PCT/DK2021/050148, all pages.

* cited by examiner

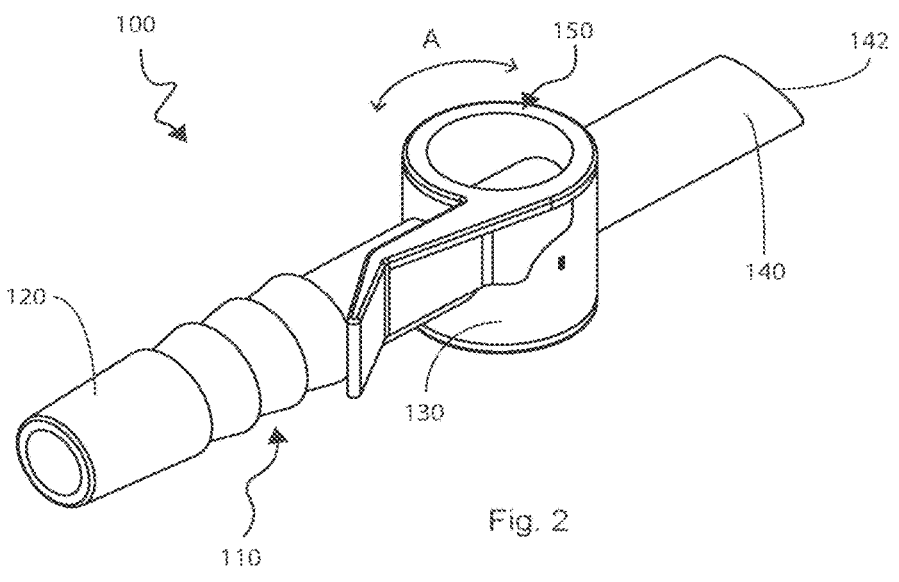
Fig. 2
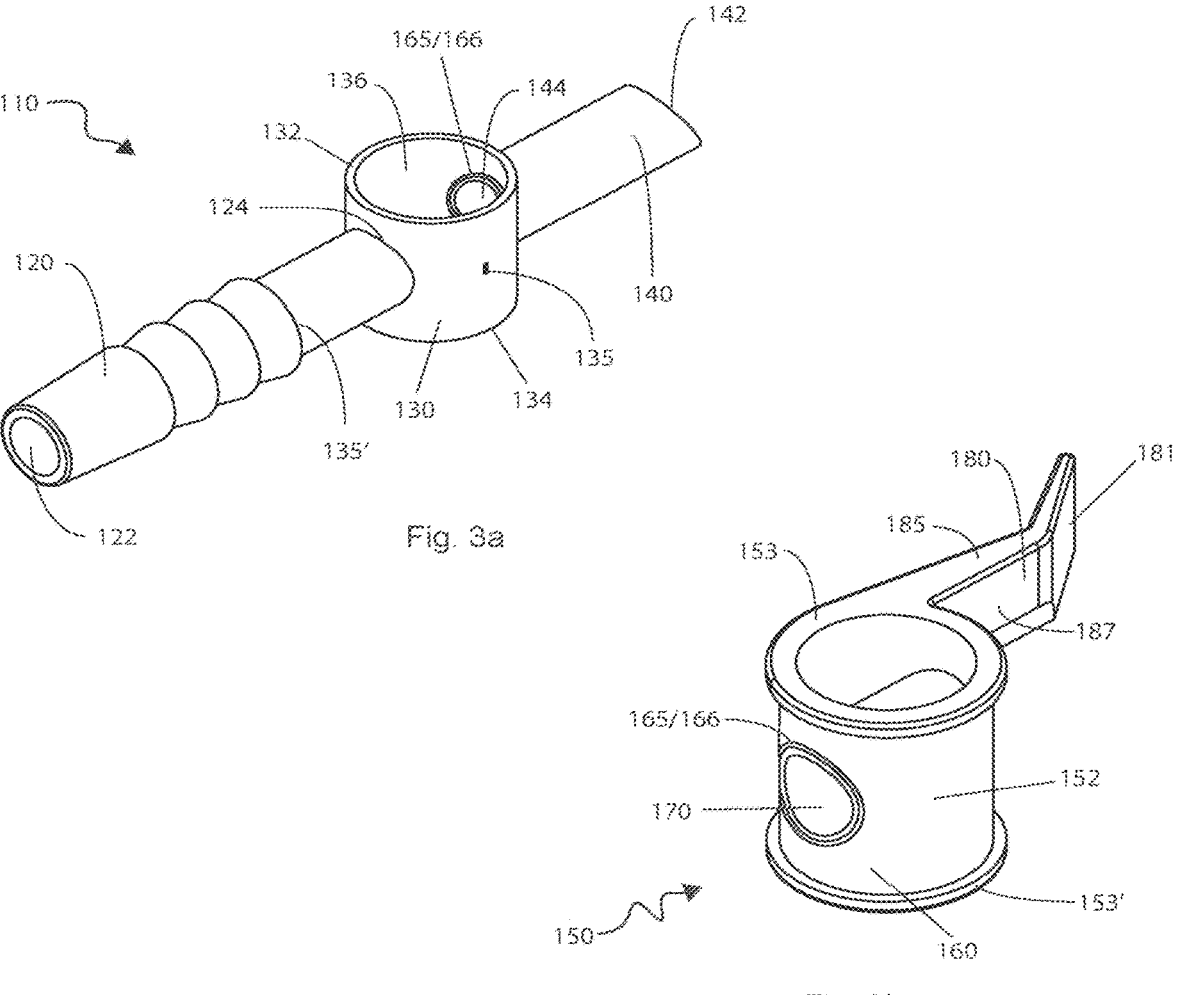
Fig. 3a
Fig. 3b

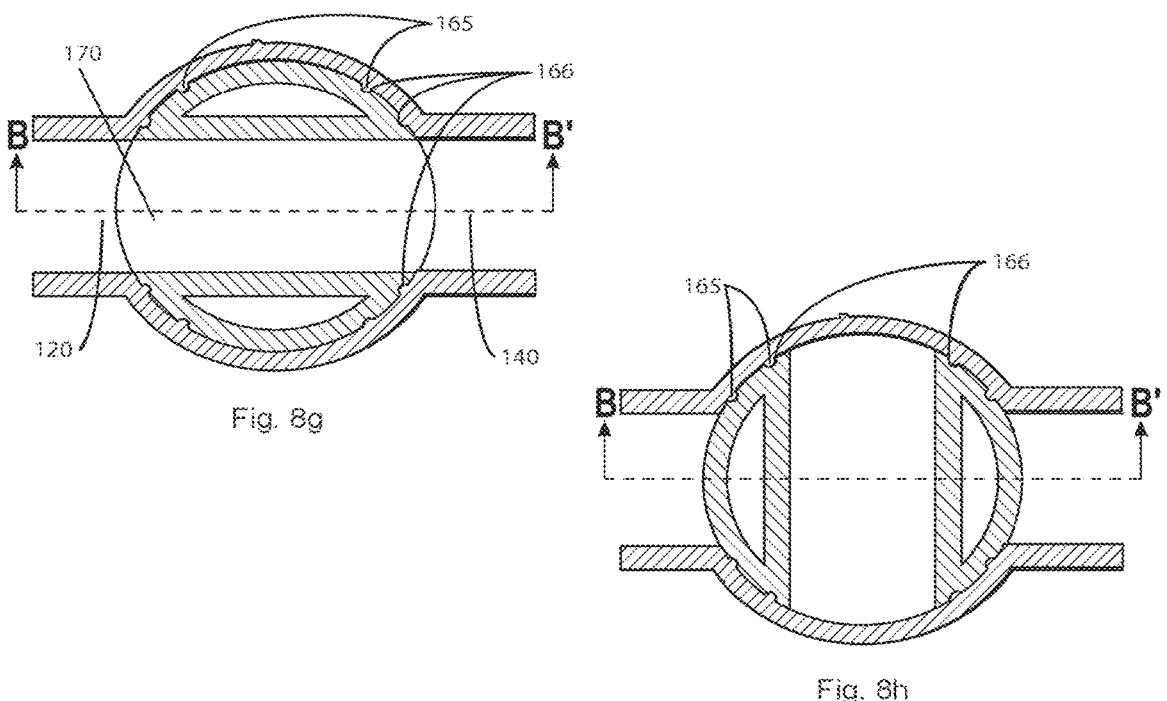
Fig. 8g
Fig. 8h
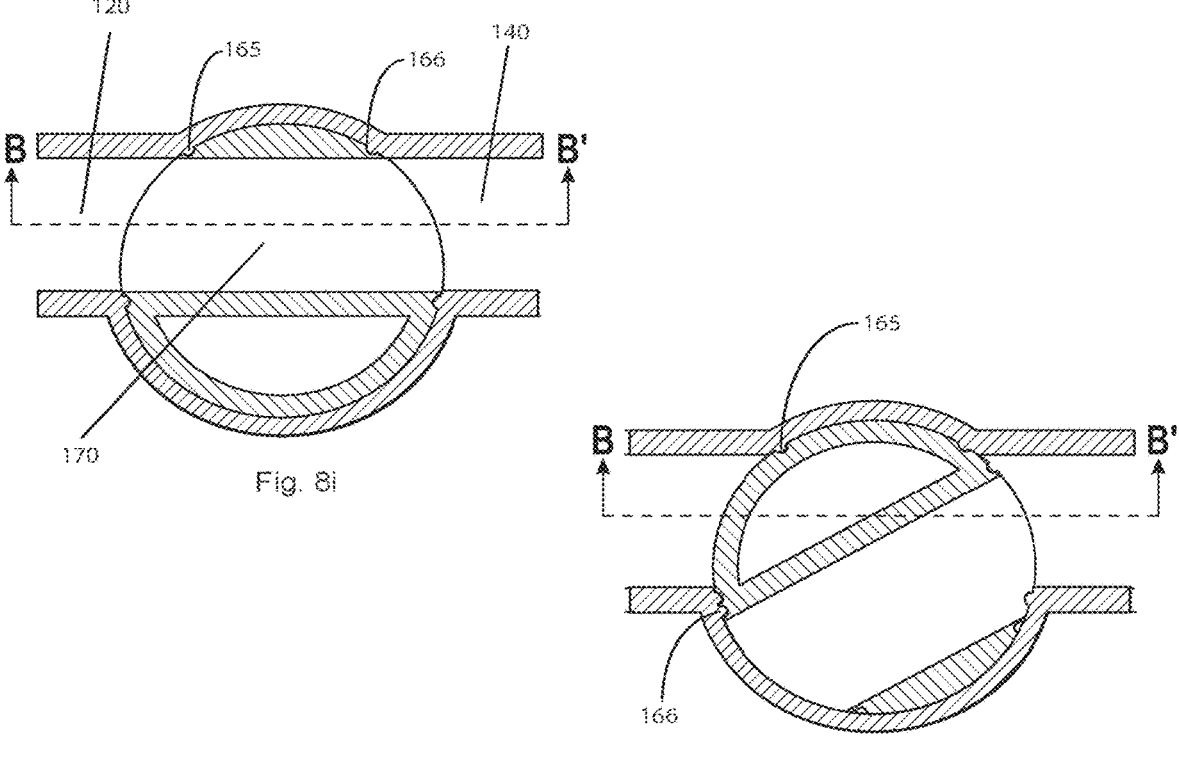
Fig. 8i
Fig. 8j

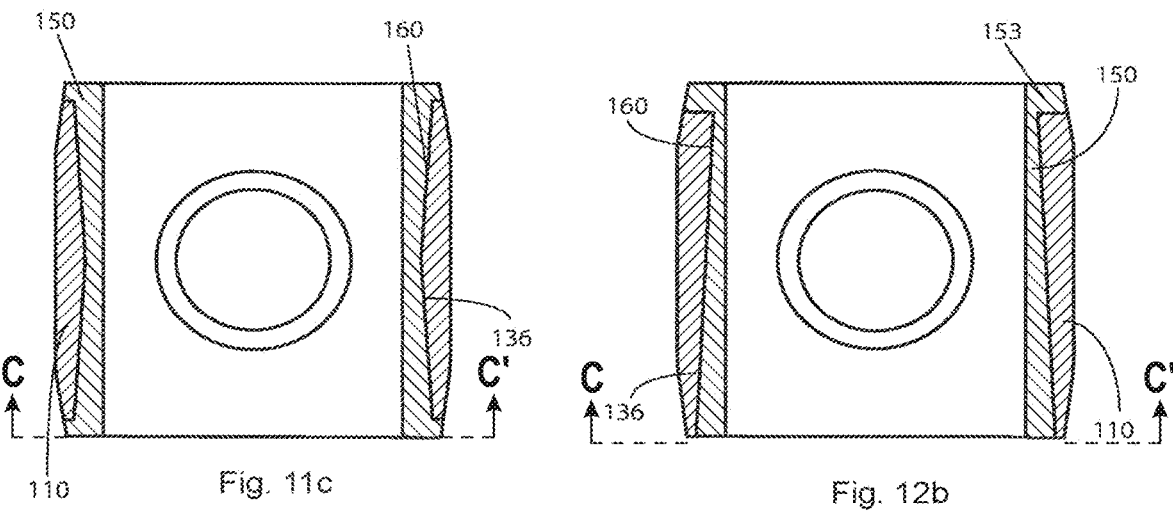
Fig. 11c
Fig. 12b
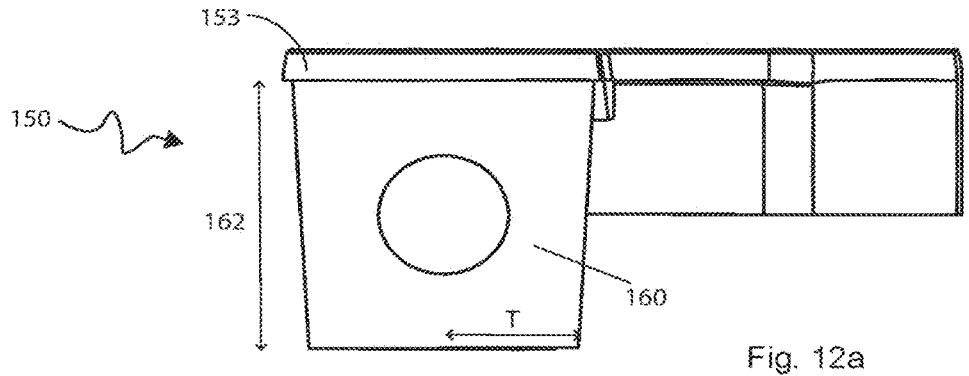
Fig. 12a
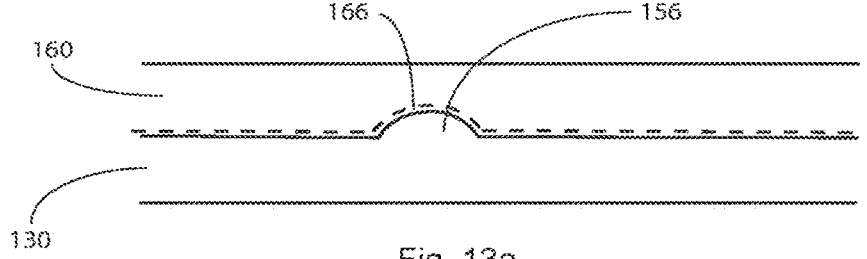
Fig. 13a
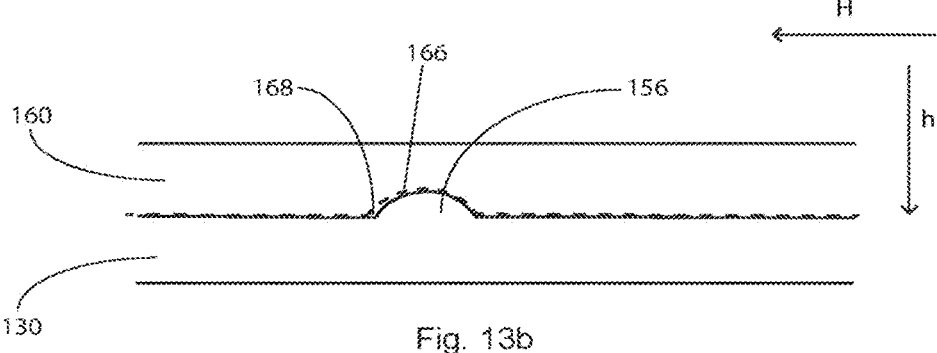
Fig. 13b

ROTARY VALVE

FIELD OF THE INVENTION

The invention relates to the field of fluid valves. Specifically, it relates to manually controlled mechanical valves for blocking or releasing flow of a fluid through a conduit.

BACKGROUND OF THE INVENTION

Valves are used in many contexts, where there is a need for controlled draining of a fluid from a container.

Such a valve may for example see frequent use when installed in the outlet of a urine bag as may be used by persons suffering from urinary incontinence or by disabled individuals for whom catheterisation is the way of urinating, and who require a means for intermittently emptying such urine bag.

For such use it is, naturally, necessary that the valve is sealed, when it is closed. Likewise, it is important that the fluid only drains through the outlet of the valve without any leakage to the sides, when it is open.

It is challenging to avoid leaking, when the valve is open, if the valve is made up of two components. One method used in the art to ensure that the valve is sealed is to coat the contact surfaces of the valve with silicone. The silicone provides an efficient seal against leakage, but it is a costly procedure to assemble the two components of such a valve with such a coating.

One way this challenge has been overcome in the art is by producing the valve as a single component. This alleviates the issue of ensuring the necessary seal between said components. Meanwhile, when releasing a fluid from a one-component valve, it is often necessary to apply pressure to the valve continuously during the draining of the connected container. This is cumbersome and especially problematic for users suffering from a disability which may be the reason why they need the valve in the first place. Thus, there is a need for an alternative solution that is cheap to produce, leak-tight both when open and closed, and which is easy to operate.

SUMMARY OF THE INVENTION

It is the aim of the current invention to alleviate at least some of the above-mentioned problems. This is achieved by producing a two-component rotary valve which is injection-moulded in two steps with no need for assembly after the injection-moulding procedure.

This two-component rotary valve for controlling the fluid flow through said rotary valve comprises:
- a valve house, said valve house comprising a fluid inlet, a house body, and a fluid outlet;
- and said house body being hollow and comprising an inside house wall described by an inner radius, and
- a plug, said plug comprising a plug tube with an outer plug wall described by an outer radius, an opening channel, and a lever; and
- said plug tube being placed at least partially inside said house body such that at least part of said outer plug wall is in contact with said inside house wall; and
- said plug being adapted to be rotatable within said house body,
- said rotary valve being characterized by comprising sealing means in the form of local variations of the inner radius of the inside house wall and local variations in the outer radius of the outer plug wall; and

- wherein there is at least one rotary position of the plug relative to the valve house for which the contour of outer plug wall matches the contour of the inside house wall, and
- wherein at least for one rotational position of the plug relative to the valve house there will be at least one point where the outer radius of the outer plug wall is equal to or larger than the inner radius of the inside house wall, thereby creating a tight seal.

The two-component rotary valve is a known valve construction, but previously it has not been possible to construct it so that it does not require a viscous sealant, such as silicone, to eliminate the risk of leakage, when the valve is open. However, incorporating changes in the radius of the house body of the rotary valve provides a sealing mechanism allowing the omission of a viscous sealant.

The variation in the radius can take different forms that may be alternative solutions, or which may be combined with each other. For example, it can be a narrow local change making the radius bigger or smaller in a longitudinal strip along the height of the house body. Such variations could be sudden as steps or they may be gradual thus leading to rounded profiles. The difference could also be for a specific region such as near an end of the house body. The change may also be local in the transverse sectional area such as for an ellipse, where the radius is larger in one direction than in the other thus leading to local differences in the radius near the end of the ellipsoid.

By the inner radius of the inside house wall and the outer radius of the outer plug wall is to be understood the distance from a common point to a point on the contour of the inside house wall or the outer plug wall, respectively. Thus, it should not be understood as limiting the geometry to that of a circle. The radii differ along the respective contours and may vary both along the longitudinal axis of the valve and for different angular positions.

By the contours outer plug wall and contours of the inner house wall matching is to be understood that for at least one rotary position, i.e. the position in which the rotary valve is cast, the contours will be similar such that the plug fits inside the house body of the valve. In the rotational position where the contours match each other, the relative variation of the outer radius of the outer plug wall, and the inner radius of the inside house wall will be the same for each angular and longitudinal position. The outer plug wall and inside house wall may have rotational symmetry so that the contours match for more rotary positions, but they must match for at least one.

By there being at least one rotary position for which there will be at least one point, where the outer radius of the outer house wall is equal to or larger than the house wall, is to be understood that the plug fits tightly inside the house body creating contact between the outer plug wall and the inside house wall thus creating a fluid-tight seal. In other words, the plug should not be loose within the house body, as no leak-tight seal can then be made. The plug and the house body must fit in dimensions such that there is contact between at least part of the outer wall of the plug and the inside wall of the house body.

In variations where there is full rotary symmetry of the plug and the house body, a fluid-tight seal is created through the radii being equal such that the outer plug wall presses against the inside house wall at all rotary positions. In cases where there is not full rotary symmetry, the radius of the outer plug wall may be larger for some rotary positions than that of the inside house wall thereby having the plug press against the house body to create a fluid-tight seal. For other rotary positions, however, the radius of the inside house wall will then be larger than that of the outer plug wall, i.e. where the longer radii of the outer plug wall were located for the rotary configuration in which the rotary valve was moulded. However, these regions will not compromise the seal of the rotary valve, as the local variations, where the radius of the outer plug wall is larger than the radius of the inside house wall, ensure the fluid-tight seal.

In other words, at least the longest radius of the outer plug wall is equal to or larger than the shortest radius of the inside house wall. Hence, although the contours of the plug and the house body match for one rotary variation, for another rotary configuration there may be angular/rotary points at which the local variations of the radius of the outer house wall lead to the radius of the outer plug wall being larger than the inside house wall thereby having the outer plug wall pressing against the inside house wall and creating a fluid-tight seal.

In yet other words, for the rotary valve, there will be at least one rotary position of the plug relative to the valve house for which the contour of the outer plug wall matches the contour of the inside house wall and wherein a longest outer radius of the outer plug wall is equal to or larger than a shortest inner radius of the inside house wall thereby creating a tight seal.

The two-component rotary valve is designed to control the flow of a fluid through the valve itself. By a fluid is understood either a liquid or a gas.

In an embodiment of the invention, the variations in the inner radius of the house body take the form of local increases, where the valve house comprises one or more sealing grooves.

Such sealing grooves may take many shapes. For example, they may be either rounded or have steep sidewalls. They may have varying width, and the number of said sealing grooves as well as their placement may differ between embodiments of the invention. The sealing grooves will be shaped such that they match a sealing lip in the plug of the rotary valve, whereby said sealing groove and said sealing lip can interlock. However, it is not required that all sealing lips match sealing grooves in all positions. While sealing grooves and lips create a seal, which hinders leakage, when the sealing grooves and the lips interlock, the rotary valve may comprise sealing lips and sealing grooves which are in some positions of the valve not interlocked, i.e. when the rotary valve is closed.

In all embodiments, the sealing grooves offer a change in the geometry of the cross section, whereby it extends across any clearance that may appear between the plug and the valve house and which may cause leakage through the first or second end of the house body in particular in the situation, where the valve is open, and liquid is present inside the opening channel located inside the house body. The interlocking sealing grooves and sealing lips become a strong sealing point of the rotary valve and can be made directly in the same material or materials from which the plug and valve house, respectively, are injection-moulded.

In another embodiment of the two-component rotary valve, the variations in the radius of the house body take the form of local decreases in said area, where said house body comprises one or more sealing lips.

Like the sealing grooves, the sealing lips may take many shapes. For example, they may have either rounded or steeper sidewalls. Also, the sealing lips may have varying width, and the number and placement of said sealing lips can also differ between embodiments of the invention. The sealing lips will be shaped such that they match a sealing groove in the plug of the rotary valve, whereby said sealing groove and said sealing lip can interlock. Thus, the sealing grooves offer a change in the geometry of the cross section, whereby it extends across any clearance that may appear between the plug and the valve house and which may cause leakage through the first or second end the house body which is a risk in particularly when the rotary valve is in the open configuration.

The interlocking sealing lip and sealing groove create strong sealing points of the structure and can be made directly in the same material or materials from which the plug and valve house, respectively, are injection-moulded.

The sealing lips and sealing grooves are capable of supplying a seal while being small enough to cause such little resistance that it will still be easy for a user to rotate the plug within the valve house to open or close the rotary valve. If the sealing lips and sealing grooves are placed such that they interlock, when the rotary valve is closed, they will still offer some resistance which means that they will help avoid unintentional opening of the rotary valve. They can also provide the user with a tactile feedback of the valve being in the open or closed position. Furthermore, it is possible to obtain these effects while keeping said sealing lips and sealing grooves small enough to prevent that the movement of the plug within the valve house requires great finger strength which may be important for elderly or disabled users.

In an embodiment of the two-component rotary valve, the valve house and the plug comprise interlocking sealing lips and sealing grooves.

By making the sealing lips and sealing grooves interlocking, it is possible to use that the two components of the rotary valve shrink differently relative to each other because the majority of the shrinkage happens right after casting, and there will be time passing between casting the first and second component. Thus, this shrinkage can have a beneficial effect when creating a leak-tight lock between lips and grooves.

However, it is also possible to get a benefit from the sealing lips when not interlocked with the sealing grooves, e.g. when they are moved away from the position, where they interlock, because they create pressure against the other component, where there is no matching sealing groove. In this way, the same structure helps keeping the rotary valve leak-tight both when it is closed and when it is open to fluid flow.

In an embodiment of the invention, the plug comprises two flanges located on opposite ends of the plug tube.

By having flanges on the opposite ends of the plug tube, they may be arranged so that they protrude on either side of the house body thereby restricting the coaxial translation of the plug relative to the valve house. If a rotary valve is produced in two components, which must be assembled subsequently, it is not possible to have more than one flange injection moulded into the plug, as it would stop said plug from entering the valve house.

Having two flanges on the plug presents several benefits. Firstly, having flanges protruding over the edges of the first and second ends of the house body contributes to the sealing of the rotary valve against leaks both when the rotary valve is closed to fluid flow and when it is open. The flange of the plug may have a sealing groove matching a sealing lip on the first and second ends of the valve house, and when the lip and groove interlock, they will ensure sealing at the ends of the valve house. This is important as this is the point, where there is a risk of fluid leakage from the rotary valve both when it is open and when it is closed. As the flanges cap the first and second ends of the valve house, they create a seal around the entirety of the valve house ends, said seal remaining equally tight when the rotary valve is closed and when it is open. In some embodiments of the invention, the placement of the sealing lip and groove may be reversed such that the groove is on the valve body, and the flange comprises a sealing lip. Like the other sealing lips and sealing grooves, the tightness of the seal is increased by the fact that the majority of the shrinkage of the two components of the two-component rotary valves happens at different times so that one may shrink towards the other. This is especially important for ensuring the sealing when the rotary valve is open and where the first and second ends of the valve house may experience significant fluid pressure, if fluid enters the space between the outer plug wall and the inside house wall which may happen in particular if the fluid flow through the open valve is blocked either by blocking of the outer opening of the fluid outlet or by solid contaminants getting stuck anywhere in the fluid inlet, fluid outlet or opening channel.

Secondly, the flanges prevent the plug from coming loose from the valve house. If the plug can move longitudinally inside the valve house, it risks moving far enough that fluid can escape the fluid inlet under the plug. If it is possible for the plug to come free entirely, the user may accidentally drop it. If it is dropped, the plug may be lost and even if it is not, reinserting it into the valve house could cause a hygienic risk. Additionally, a seal relying on a viscous sealant may become less efficient, if the plug is removed entirely, and may come into contact with unfavourable external environments.

In another variant, the rotary valve has a flange on the plug only at the first end of the house body, while the other end of the house body is moulded closed at the second end. In such a variant, an undercut groove in the inside of the house body near the second end, where the valve house is moulded without an opening, may accommodate a flange of the plug to ensure the benefit of the plug not being able to move translationally within the valve house.

In a preferable embodiment, the change in radius for this top sealing lip is steep thus creating a sudden step. In a more preferred embodiment, the change in the inside radius is accompanied by a change in the wall width of the house body so that the top sealing lip becomes a narrow protrusion rather than a step.

In an embodiment of the invention, the lever on the plug is connected to both of the opposite ends of the plug tube.

By having a single lever connected to both of the opposing ends of the plug tube, e.g. connected to both of the flanges, the rotational force applied through the lever to the plug may be transferred more evenly. Distributing where the force is applied to the plug minimises the risk of the plug getting twisted inside the house body. If the plug is twisted, in addition to being rotated, the user will need to apply more force to achieve the intended rotation and to open or close the rotary valve. Furthermore, if the plug is twisted within the house body, the force, which is not used for rotation, may cause deformation of the valve house and/or the plug thereby causing damage to the rotary valve and decreasing its lifetime.

Furthermore, a lever which is attached at both of the opposing ends of the plug can naturally be made wide thereby making it easier to handle for people with motoric difficulties.

If such a lever was to be installed in a conventional rotary valve, which is assembled after finished casting, it would be necessary to make it in three pieces rather than two, as the plug itself must be two separate pieces that are mounted into the valve house from either side. This will make the production process increasingly expensive. Furthermore, the lever itself would have to be assembled from two parts, thereby making it more fragile and decreasing the benefits of the wider lever, as this may reintroduce the risk of twisting the plug inside the valve house.

In an embodiment of the invention, the local variations in the radius of the house body take the form of an increase locally at either or both a first end of said house body and a second end of the house body, where said house body has an end sealing lip.

Should any of the fluid get into a clearance space between the house body and the plug despite sealing means placed near the fluid inlet and the fluid outlet, it is important that leakage does not occur anywhere else on the rotary valve. The valve body may have openings also at either or both of the first and second end of the house body, thus including sealing means at these ends ensuring that the user will not experience leakage from anywhere on the rotary valve.

Sealing means at the ends of the house body can take various forms, e.g. using the flange to either envelop the ends of the house body, cap the ends of the house body without enveloping it, or have flanges which are inside the house body in undercut grooves.

In an embodiment of the two-component rotary valve, either or both the first end of said house body and the second end of the house body and corresponding flanges comprise sealing means in the form of interlocking end sealing lips and end sealing grooves.

Sealing means at the ends can take the form of sealing lips or sealing grooves similar to those on the inside of the house body. By placing matching sealing lips or sealing grooves in the flange, where it meets the end of the house body, it can be utilised that the material of the two components will shrink inwards at a different rate, and a tight seal can be created.

End seals can work in combination with internal seals placed on the inside wall of the house body. Since any fluid coming from the fluid inlet will have to pass each seal in succession, and even if the first seal does not stop all of the fluid, the next seal—such as the end seal—may be able to stop any fluid that got past the first seal, thus ensuring that the user will experience no leakage from any opening of the rotary valve.

In an embodiment of the invention, the local variations of the inner radius of said house body lead to an oval transverse sectional area of said house body.

In other words, the contour of the house body will be oval aside from any local variations in the form of sealing lips and/or sealing grooves. In yet other words, the transverse sectional geometry of the house body is oval. The outside of the plug will have a matching oval cross section, while the inside of the plug may have any shape, e.g. it could be filled or hollow around the opening channel running through the plug. Similarly, the outside of the house body may take any geometry, e.g. it could comprise slight indents to provide a better grip for the user, a protrusion stopping the rotation of the plug at the open position, or it may have another shape for purely aesthetical reasons without it influencing the inside geometry of the house body or the benefits thereof.

As rotation opens the rotary valve, it is important that it does not happen unintentionally. A mutually oval shape of the valve house and plug ensures that a slightly larger force is required for the user to change the valve from the closed to open position. The lever on the plug ensures that this force is easily supplied by the user, while the ovality ensures that the plug will not rotate without engaging the lever.

The ovality of the plug is such that the longer axis is perpendicular to the direction of fluid flow through the rotary valve. This geometry increases the sealing effect of the rotary valve, as it decreases the curvature at the openings to the fluid input and fluid output thus making it less likely for fluid to leak into a clearance space between the house body and the plug. This is because a fluid is most likely to leak into a clearance space between the valve house and plug at the point of highest curvature.

Unanimously increasing the radius of the plug and house body at all angles would also decrease the curvature of the plug at the opening of the fluid inlet, but that would increase the overall size of the rotary valve too. The oval transverse section provides the benefits of a lower curvature while maintaining a small footprint for the rotary valve.

In the particular context, where the rotary valve is connected to a urine bag, it is especially important that said rotary valve is small and discreet as well as easy to operate. Being able to have the bag placed on the body of the user in an unobtrusive manner, where it can easily be kept out of view, e.g. under clothes, is important for users to not feel exposed. This is only achievable, if the rotary valve is compact. Similarly, it is important that the user can rely on the rotary valve to not open accidentally while carried around, e.g. by the friction of clothes or tugging on tubing.

Furthermore, the oval shape of the plug within an oval house allows a tight seal, as the longitudinal part of the plug presses against the slightly smaller transverse part of the house. When the rotary valve is in the closed configuration, the oval plug will extend slightly into the inner opening of the fluid inlet and the inner opening of the fluid outlet contributing to a tight seal, where the inner wall of the house body and the outer wall of the plug are in contact.

In a preferred embodiment of the invention, the long axis of the oval transversal section is between 1.01 and 1.3 times longer than the short axis.

In a more preferred embodiment of the invention, the long axis of the oval transversal section is between 1.03 and 1.06 times longer than the short axis.

In an embodiment of the rotary valve, the local variations of the inner radius of said house body and corresponding local variations of the outer radius of said plug lead to at least one conical section along said inside house wall and outer plug wall.

Such conical sections may span the entire height, i.e. along the central axis of the house body and plug or in other words with respect to an axis perpendicular to the fluid, flow through the open rotary valve, or it may be multiple sections along this height. Such multiple sections may be angled with differing steepness and in different directions.

In one variant of the invention, the inside house wall and outer plug wall may have two conical sections angled such that the transverse sectional area is widest at the opposing ends of the house body and plug, while the transverse sectional area is smallest at the opening channel. Such a geometry may be considered an hourglass shape where the waist is located at the opening channel.

Making the rotary valve with an hourglass shape for the inside house wall and outer plug helps provide a leak-tight seal of the rotary valve both in the open and in the closed configurations of said valve. This is an effect of the casting process. When the rotary valve is cast, the material will shrink inwards towards its centre, when the material is cooling and curing. As the structure shrinks inwards towards the narrow waist, the two components will press tightly against each other thereby creating a fluid-tight seal. In a preferred embodiment, the house is cast first, and it will shrink to some extent, before the plug is cast. As the plug cures, it will shrink inwards towards the waist of the hourglass shape, i.e. towards the opening channel, thereby pressing inwards towards the narrower point of the inside house wall and creating a tight seal.

In another embodiment of the invention, only a single conical section will be present on the inside house wall and outer plug wall, said conical section spanning the full height of the rotary valve. In such an embodiment, the plug would comprise only a single flange at the end, where the angle of the conical section has led to the smallest transverse sectional area or in other words, the local variation of the radius has led to said radius being the smallest. In this way, a tight seal will be created during the curing process where the components shrink. As they do not shrink at the same rate because of being cast at different times, the shrinkage of the second component will lead to it pressing tightly against the component cast first. By having a flange in only one end, the direction of shrinkage is controlled. This ensures that the shrinkage will be towards the narrowest point of the conical section thereby providing a fluid-tight seal between the two components. Such a seal remains tight for both the open and closed configuration of the rotary valve.

In an embodiment of the invention, the rotary valve is changed from an open configuration to a closed configuration by turning said lever by approximately 90 degrees.

The rotary valve can be opened by turning the lever from being placed along the fluid inlet or the fluid outlet to be protruding away from the house body. In a preferred embodiment, the rotation needed to open/close the rotary valve is between 20-160 degrees. In a more preferred embodiment, the rotary valve will go from being fully closed to being fully open by a rotation of approximately 90 degrees. The rotation of a quarter circle ensures that the opening channel running through the plug can be positioned when it is closed so that it is perpendicular to the direction of flow in the open configurations. This geometry eases the full block of the flow, when the rotary valve is closed.

In addition, it makes it easy for the user to engage the lever when moving it to the position, where the lever is along the house body, when the lever is protruding from the body. This may be beneficial for example if the valve is open in the configuration, where the lever is protruding from the body. In that case, closing the valve may be made easier for the user, and this may be important, if it is necessary to close the rotary valve quickly. Similarly, such a configuration would ensure that if the lever is caught on something or subjected to pressure, when the user moves around, it is most likely to be pressed towards a closed position thus minimising the risk of leakage through a partially open valve.

In another embodiment of the invention, the lever of the rotary valve is placed along the fluid inlet or fluid outlet, when said rotary valve is open and is turned to be along the fluid outlet or fluid inlet, respectively, when said rotary valve is opened.

When the lever lies along the input and output in both the closed and the open positions, it is ensured that the rotary valve is compact in both positions. In this configuration, the lever will not protrude significantly from the valve house which means that the user is less likely to get poked by it or have it press against them in an uncomfortable manner. In addition, the lever is less likely to get caught on something such as clothes or otherwise be accidentally turned from one position to another, when it is not protruding significantly from the valve house.

In some embodiments of the invention, a protrusion may be formed on the outside of the house to function as a stopper which limits the extent which the lever can turn. Such a stopper ensures that overturning will not take place, where the opening channel is inadvertently partially opened or closed, as the opening channel is not parallel or orthogonal to the fluid inlet and fluid outlet as intended in the open and closed positions respectively.

In a variant of the invention, the lever being positioned along the direction of fluid flow through the open rotary valve is to be understood such that it is placed at an angle less than 30 degrees with respect to the fluid flow through the rotary valve.

A variant of the two-component rotary valve for controlling the fluid flow through the rotary valve comprises a valve house comprising a fluid inlet, a house body, and a fluid outlet, and the house body is hollow and comprises an inside house wall described by an inner radius, and a plug comprising a plug tube with an outer plug wall described by an outer radius, an opening channel, and a lever, and the plug tube is placed at least partially inside the house body such that at least part of the outer plug wall is in contact with the inside house wall, and the plug is adapted to be rotatable within the house body, the rotary valve is characterised by comprising primary sealing means and secondary sealing.

By primary sealing means is understood sealing means designed to confine the fluid to the intended flow path, i.e. the fluid inlet, the opening channel and the fluid outlet. Such a primary sealing means can take many forms such as but not limited to a tight fit of the plug inside the valve house, a sealing lip and sealing groove encircling or otherwise surrounding the inside openings of the fluid inlet and fluid outlets, and an oval cross-sectional shape of the house and plug. There may be multiple sets of primary seals that are designed to prevent leaks in the closed and/or open position of the rotary valve.

By secondary sealing means is understood a sealing means designed to prevent any fluid from leaking out of the rotary valve, if that fluid has escaped the intended flow path through the fluid inlet, fluid outlet and opening channel, i.e. from leaking out of the rotary valve from anywhere other than the fluid outlet which will primarily be through the first and second ends of the house body. The secondary sealing means can take various forms that may be similar to or differ from those of the primary sealing means. Secondary sealing means can for example be, but are not limited to, sealing lips and sealing grooves encircling the first and second ends of the house body either on the inside house wall and outer plug wall or located in the end faces of the house wall, flanges on the plug which may comprise sealing lips or sealing grooves as well, variations in the radius leading to a conical shape of the plug and/or the inside of the house wall.

It is to be understood that primary and secondary sealing means can be used in combination and they may either be independent of each other, or they may interact to improve the sealing effect further. Many different combinations of primary and secondary sealing means are within the scope of the invention. Some preferred variants are sealing lips and sealing grooves encircling the inner opening of the fluid inlet and inner opening of the fluid outlet in combination with flanges on the plug and more preferably also in combination with sealing lips protruding from the flanges and engaging sealing grooves on the end face of the first and second ends of the house body. Another preferred embodiment is like the previously mentioned with an additional primary sealing means in the form of an oval cross-sectional shape of the house body and plug.

In a variant of the invention, the rotary valve comprises a primary sealing means and at least two types of secondary sealing means.

By a primary sealing means is understood a primary type of sealing means. This can for example be one or more sets of sealing lips and sealing grooves, e.g. around either or both of the inner openings of the fluid inlet and fluid outlet.

By two types of secondary sealing means is understood two different means of sealing, e.g. sealing lips and sealing grooves, flanges or a conic cross section of the house body and plug.

Having multiple secondary sealing means makes it possible to provide a sealing effect against a fluid pressure in multiple direction, e.g. both radially and axially with respect to the coaxial direction of the plug and the house, thereby decreasing the risk of any fluid leak out of the rotary valve.

The combination of a single type of primary sealing means and multiple secondary sealing means allows a simplification of the rotary valve in that only a single primary sealing means is necessary. This may make the primary seal slightly less tight, while the multiple secondary sealing means mitigate any adverse effects of this as they hinder leakage of any fluid escaping the intended flow path. In addition, since the primary sealing means lessens any flow of the fluid away from the intended flow path, the pressure on the secondary sealing means is decreased making it possible for them to maintain a leak tight seal of the rotary valve.

In other variants, the rotary valve may have two or more primary seals in combination with a single secondary sealing means. In yet another variant of the invention, the rotary valve may have two or more primary sealing means along with two or more secondary sealing means.

In a variant of the invention, the rotary valve comprises a primary seal in the form of one or more sealing lips and corresponding sealing grooves in the inside house wall and outer plug wall, respectively.

Sealing means in the form of sealing lips and sealing grooves can efficiently be made in both inner and over moulding, where the structure from the first cast component is inverted in the second cast component thereby making it a structure which is efficient to produce through casting of the rotary valve.

In some variants of the rotary valve, the sealing lips protrude from the plug, and the sealing grooves are indent in the inside wall of the valve house. In other variants, the sealing lips protrude from the inside wall of the house body, while the sealing grooves are indents in the outer plug wall. In some variants, there may be a combination of sealing lips protruding from the inside wall of the house body and sealing grooves indented in the inside wall of the house body just as the outer wall of the plug may have such a combination.

In a variant of the invention, the primary sealing means take the form of one or more sealing lips and corresponding sealing grooves in the inside house wall and outer plug wall, respectively, wherein the sealing lips and sealing grooves encircle the inner opening of the fluid inlet and fluid outlet.

By the sealing lips and sealing grooves encircling a region is to be understood that they form a closed and continuous structure around that region. In some cases, such a closed and continuous structure may be a circle, but in other cases it might be an ellipsoid or have an irregular shape. In a preferred embodiment, the contour of the sealing lips and sealing grooves will be similar to that of the inner opening of the fluid inlet and fluid outlet, respectively. In some variants, the primary sealing means may trace the outer edge of the inner opening of the fluid inlet and fluid outlet as well as the outer edge of the opening channel while in other variants, the area might be larger thus allowing for a small gap between the edge of the inner opening of the fluid unlet and fluid outlet as well as the opening channel and the structure of the sealing means. For example, in the case of a circular opening and sealing means, the sealing means would have a larger radius in such a variant. The shape of both the inner opening of the fluid inlet and fluid outlet as well as the sealing lips and sealing grooves will be affected by the curvature of the house body and the plug such that they might not be circular. Hence, encircling should not be seen as limiting to a circular shape. In yet other variants, the shape of the sealing lips and sealing grooves while matching each other might differ from the contour of the inner opening of the fluid inlet and fluid outlet as well as the opening channel, as long as they form a closed structure around this and thereby create a continuous sealing barrier against any fluid leaking from the intended flow path.

In a variant of the invention, the rotary valve comprises primary sealing means in the form of sealing lips and sealing grooves encircling the inner opening of the fluid inlet and fluid outlet while in combination with secondary sealing means.

The encircling sealing lips and sealing grooves create a continuous barrier to minimise leaking of fluid away from the intended fluid flow path through the fluid inlet, opening channel and fluid outlet. Should a small amount of fluid pass through the set of sealing lips and sealing grooves encircling the inner opening of the fluid inlet and fluid outlet, the presence of secondary sealing means will ensure that this fluid dos not leak out of the rotary valve but is contained within the rotary valve between the plug and the house body, such that no fluid leaks to the surroundings.

In a preferred variant of the invention, the rotary valve comprises sealing lips and sealing grooves encircling the inner opening of the fluid inlet and fluid outlet in combination with sealing means at the first and second ends of the house body, where the end sealing means have rotary symmetry.

In other words, the primary sealing means are in the form of sealing lips and sealing grooves encircling the inner opening of the fluid inlet and fluid outlet in combination with secondary sealing means, wherein the secondary sealing means have rotational symmetry.

By the secondary sealing means and/or the end sealing means having rotational symmetry, it is ensured that they provide a seal for all configurations of the rotary valve. This means that they will provide a seal, while the rotary valve is open, while it is closed, and while it changes from closed to open and back again. This ensures that the rotary valve remains leak tight, and even if the primary sealing means is more efficient in the open or closed configuration, the secondary sealing means will ensure that the rotary valve remains leak-free.

In some variants of the invention, the primary sealing means are in the form of sealing lips and sealing grooves encircling the inner opening of the fluid inlet and fluid outlet in combination with a secondary sealing means in the form of flanges in both ends of the plug.

In a preferred variant, the flanges at the ends of the plug are contacting the first and second ends of the valve house, respectively.

Flanges at the end of the plug provide additional contact points between the plug and the house body, i.e. at the first and second ends of the house body. These are particularly suited as sealing means, as they provide a contact in a direction perpendicular to the direction of flow of any fluid in the space between the inside wall of the house body and the outer wall of the plug thereby blocking the flow and requiring additional pressure behind the fluid to escape the seal and cause a leak.

Furthermore, the flanges prevent the plug from being pushed out of the valve house, if the rotary valve is subjected to pressure.

In a yet more preferred variant, the plug is cast in a single piece with no assembly required and comprises flanges at both ends.

By having the plug cast in a single piece with no point of assembly, the number of places, where a fluid could leak out of the rotary valve, is minimised, as there are fewer potential openings. That is to say, having a plug cast in a single piece with no assembly and the valve house cast in a single piece with no assembly, the only possible place of leaking is between the plug and the valve house, while there are no undesired opening in each of the separate components. Hence, sealing means are required only to take care of the risk of leak between the components, i.e. at the interface between the fluid inlet, opening channel and fluid outlet as well as at the first and second ends of the house body.

In an even more preferred variant, the rotary valve comprises an additional secondary sealing means aside from the flanges.

In a yet more preferred variant, two types of secondary sealing means are present in addition to the sealing lips and sealing grooves encircling the inner openings of the fluid inlet and fluid outlet. These secondary sealing means take the form of flanges at both ends of the plug, wherein the flanges each comprises a sealing lip engaging a sealing groove at both the first and second ends of the valve house.

In addition to the previously described benefits of the flanges, having sealing lips protruding from the face of the flange, which contact the end faces of the valve body and engaging sealing grooves in that valve body, contributes to an even stronger seal. Just as the flanges provide a seal perpendicular to the direction of flow of fluid between the inside house wall and the outer plug wall, the sealing lip provides a seal perpendicular to the flow of any fluid that would have managed to get in between the flange and the end of the house body. Hence, the two secondary sealing means, i.e. the flange with the protruding lip, provide sealing means in two directions perpendicular to each other, as they allow the end of the plug to produce a force against the house body in both the radial and the axial direction. Hence, all three types of seals, i.e. the primary seal in the form of sealing lips and sealing grooves and the two secondary seals in the form of the flange and additional sealing lips and sealing grooves work together to decrease the flow of fluid away from the intended flow path to the point, where there is not enough pressure of the fluid to escape the rotary valve and cause a leak.

Further, the invention covers a method for creating a two-component rotary valve comprising the step of: Injection moulding of one component followed by injection moulding of the other component either in the form of inner moulding or over moulding, whereby the first component takes part in shaping the second component, wherein the shrinkage of the components after moulding during the cooling of the materials is utilised to improve the seal of said rotary valve.

Injection moulding is a known method in the art of producing many different types of components. The same is the case for inner moulding and over moulding. However, the method has not been used previously for production of two-component rotary valves, as it has not been possible to keep such valves leak-tight without the addition of a viscous sealant.

Injection moulding the first and second components of the two-component rotary valve directly into each other as done with inner or over moulding has the benefit of the rotary valve being assembled during the casting procedure with no extra steps involved. This leads to a significant decrease in production costs, as an assembly machine or person can be avoided.

Obtaining a leak-tight rotary valve through injection moulding with inner or over moulding is possible because of the sealing lips and sealing grooves as well as the oval shape of the plug and house body. The shrinkage of the injection-moulded material has been accounted for in the design of the produced parts and plays an integral role in ensuring that the final product is indeed sealed.

In an embodiment of the invention, said first component to be injection-moulded is said valve house, and the plug is injection-moulded inside said valve house using said valve house as a mould, whereby the method is inner moulding.

Inner moulding of the two-component rotary valve leads to the plug shrinkage inwards away from the valve house during cooling. This shrinkage will lead to the part of the flange surrounding the top sealing lip pushing against said top sealing lip and enhancing the sealing effect. In a preferred embodiment, the common practice of topping up the material for the plug, which is the second to be cast, uses the packing pressure during the injection moulding process to increase the pressure between the inside of the valve house and the outside of the plug.

In an embodiment of the invention, the method for creating the two-component rotary valve involves that the second component is moulded by injecting material twice in rapid succession, whereby the speed and magnitude of shrinkage is controlled.

As described above, there are benefits of both inner and over moulding. To further control where and how an injection-moulded component shrinks, it is possible to inject the relevant material twice—that is to refill or top up the mould once the shrinkage has begun. The second injection of material happens rapidly after the first, so that the material applied in the first step of the casting is not allowed to cure before it is topped up. In this way, the shrinkage will be decreased in some parts of the component, as the second burst of material injection will create an increased pressure on the component and counteract the shrinkage.

This method of topping up the material is in particularly beneficial for two-component systems, where the two components are to move relative to each other as in the rotary valve of the present invention. Topping up the material by a second injection allows control of where the components fit most tightly together and where the fit is loose enough for movement to be possible.

In a preferred variant of the method, it comprises the step of: First injection moulding the valve house and subsequently injection moulding the plug inside said valve house, whereby the valve house takes part in shaping the plug, wherein the shrinkage of the plug during the cooling of the materials is utilised to improve the seal of said rotary valve, as the plug comprises flanges, and the shrinkage of the plug will cause increased force between the flanges and the end faces of the house body.

By using inner moulding, where a plug with flanges is cast as the second component inside the valve house, but where the flanges extend outside the valve house and are in contact with the end faces of the valve house, the shrinkage of the plug provides pre-stressing of the flanges against the valve house thus creating a tight seal based on the shrinkage of the material of the plug, as it cools. Furthermore, the shrinkage of the plug inside the valve house can lead to a slight clearance between the inside house wall and the outer plug wall thus decreasing the friction between said walls during rotation of the plug inside the valve house as necessary when opening or closing the rotary valve. In the combination between the increased force between the flanges and the ends of the valve house and the decreased force between the inside house wall and outer plug wall, the torque required to rotate the plug inside the valve is kept low, while a leaktight rotary valve is still obtained.

The effect of increasing the force between the flange and the valve house due to shrinking applies to both the flat face of the flanges and to any lips protruding from the flanges. The shrinkage is towards the centre of mass of the cast plug and thus will be both radially and axially inwards creating tension and force between the ends of the valve house with the flange and the lip, respectively, in both directions.

In an embodiment of the invention, said first component to be injection-moulded is said plug, and said valve house is injection-moulded around said plug by way of over moulding.

Over moulding of the two-component rotary valve leads to the valve house shrinking inwards around the plug. This shrinkage means an increased force between the inside of the valve house and the outside of the plug, whereby risk of leakage is decreased.

SHORT LIST OF THE DRAWINGS

In the following, example embodiments are described according to the invention, where FIG. 1 is a urine bag with a rotary valve connected to an outlet tube.

FIG. 2 is a rotary valve according to the invention shown in perspective.

FIG. 3a is a valve house of the rotary valve according to one variant of the invention shown in perspective.

FIG. 3b is a plug of the rotary valve according to one variant of the invention shown in perspective.

Figures 7A, 7B, 7C, 7D, 7E:
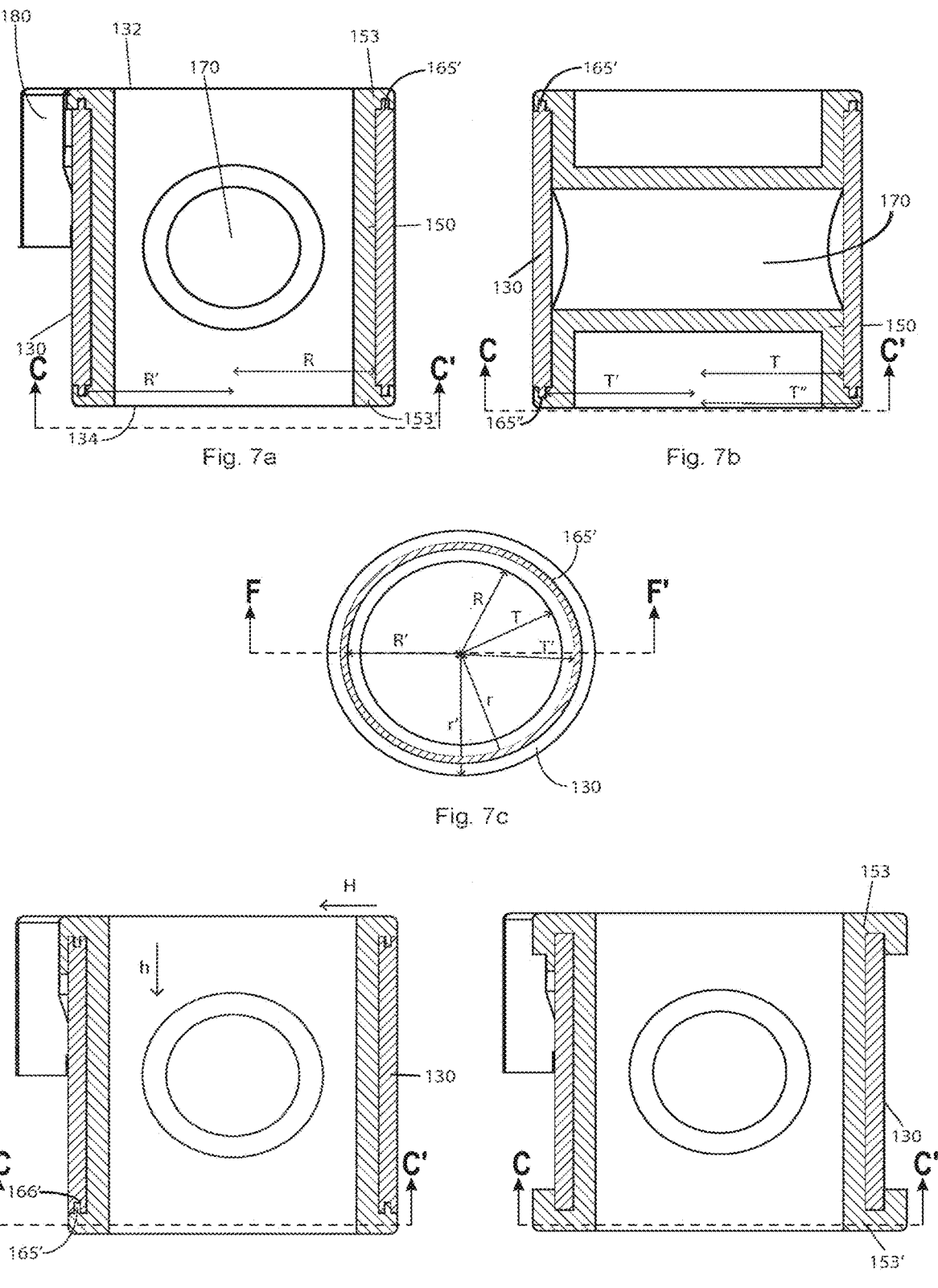

FIGS. 7*a*-7*b* are transverse cross-sectional views of the rotary valve comprising end sealing lips shown in open and closed configurations, respectively.

FIG. 7*c* is a top view of the house body of the rotary valve comprising an end sealing lip.

FIGS. 7*d*-7*e* are transverse cross-sectional views of the rotary valve illustrating various embodiments of end sealing means.

FIGS. 8*a*-8*j* show longitudinal cross-sectional views of the region of the rotary valve around the house body and plug illustrating various embodiments of sealing lips and sealing grooves for open and closed configurations of the rotary valve, respectively.

Figures 9A, 9B, 9C, 9D:
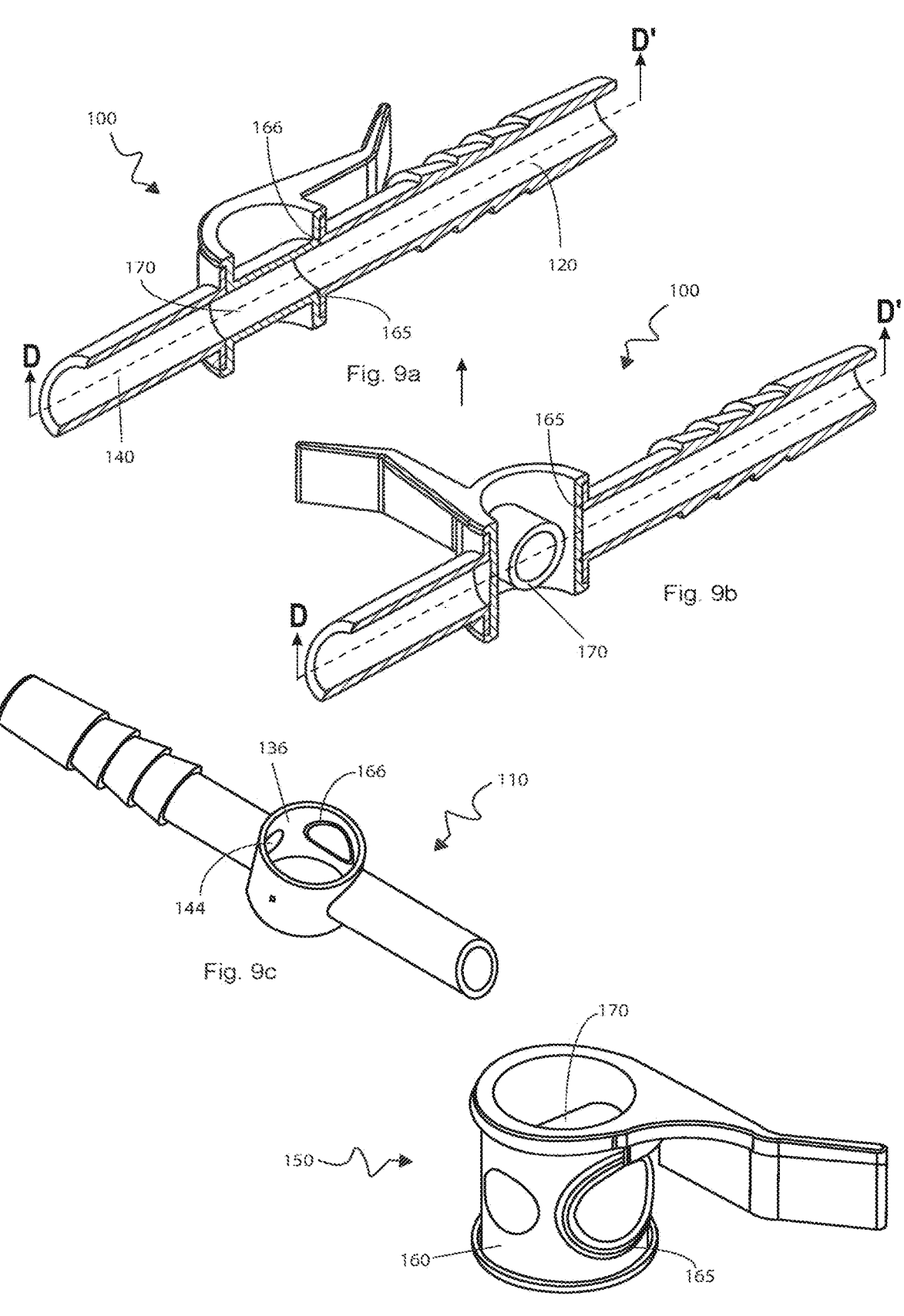

FIGS. 9*a*-9*b* show cross-sectional views of the circular sealing lips in open and closed configurations of the rotary valve, respectively.

FIGS. 9*c*-9*d* show the valve house and plug with circular sealing lips separately.

Figures 10A, 10B, 10C, 11A, 11B:
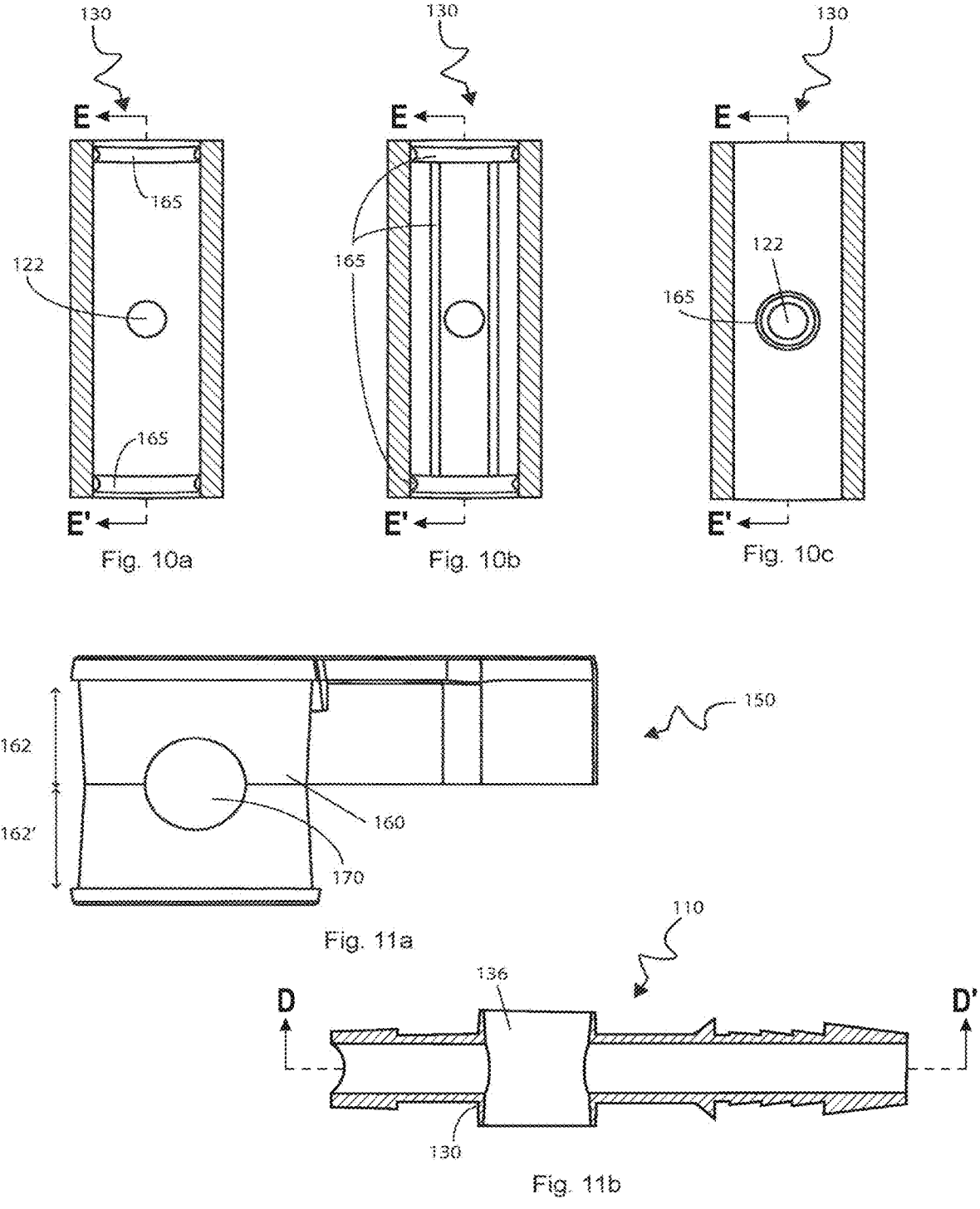

FIGS. 10*a*-10*c* are transverse cross-sectional views of the valve house illustrating various embodiments of sealing lips.

FIGS. 11*a*-11*c* show various views illustrating a rotary valve with conical sections leading to an hourglass shape of the inside house wall and outer plug wall.

FIG. 12*a* and FIG. 12*b* show different views illustrating a rotary valve and a single conical section spanning the full height of the rotary valve.

FIG. 13*a* and FIG. 13*b* illustrate the sealing effect that the shrinkage of the rotary valve material during cooling has on sealing lips and sealing grooves.

Figure 14:
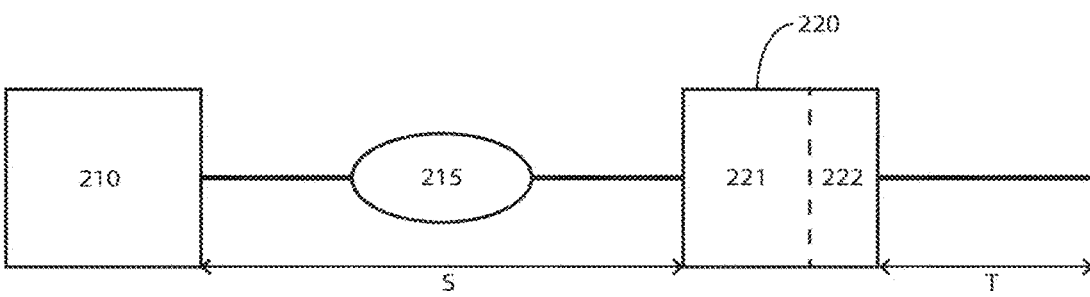

FIG. 14 is an illustration of the process flow of inner moulding of the rotary valve.

Figure 15:
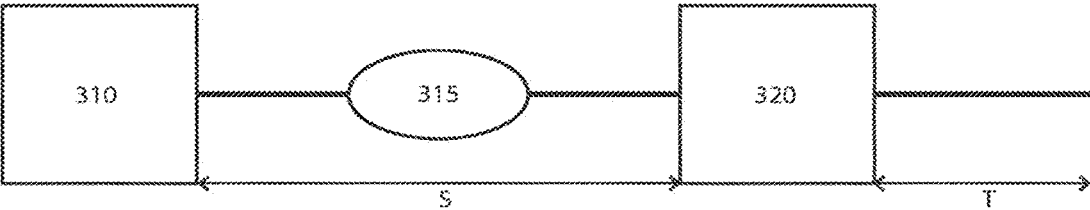

FIG. 15 is an illustration of the process flow of over moulding of the rotary valve.

FIGS. 16*a*-16*d* are an illustration of the parts of a variant of the rotary valve having sealing means in the form of a combination of a seal encircling the opening channel and sealing lips in the flange of the plug.

DETAILED DESCRIPTION OF DRAWINGS

In the following, the invention is described in detail through embodiments thereof that should not be thought of as limiting to the scope of the invention.

Figure 1:
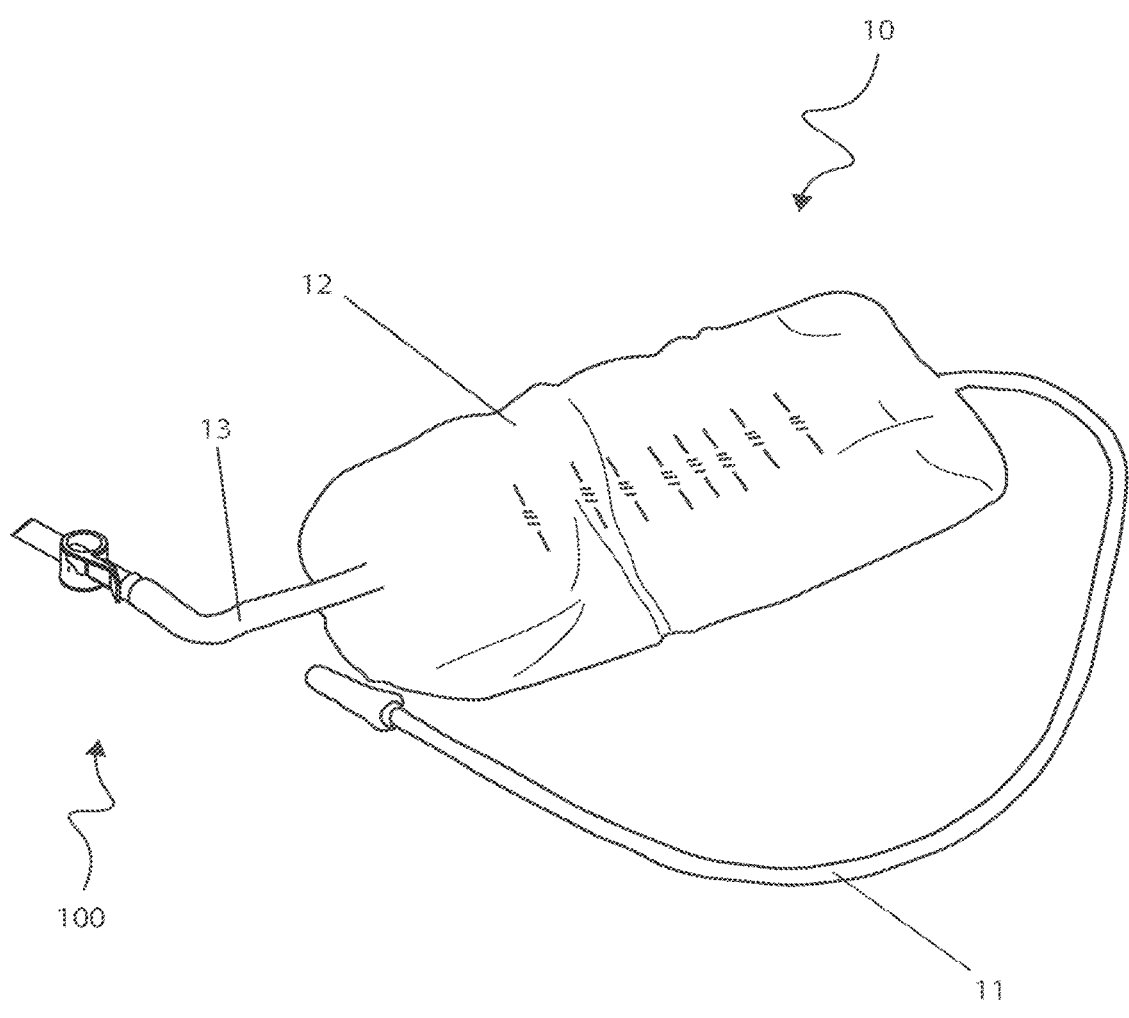

FIG. 1 is a sketch of a urine bag 10 with a rotary valve 100 connected to an outlet tube 13. This is a common use of the rotary valve 100, but it may be connected to many other types of fluid systems, where a leak-tight valve is useful for controlled releasing of the fluid from a container. Examples of such other systems are beverage kegs, from which the user may want to tap liquid, and fluid circulation systems, where the user may wish to take a sample of the fluid to control the quality of the liquid in the system.

In the case of a urine bag 10, it is common to have an inlet tube 11 which can be connected to a catheter (not shown). The inlet tube 11 allows fluid to flow into the bag 12, where it will accumulate as long as the rotary valve 100 is closed. The rotary valve 100 is connected functionally to an outlet tube 13. Once the user would like to drain the contents of the bag 12, the rotary valve 100 can be opened, and the fluid drained.

FIG. 2 shows a rotary valve 100 according to the invention. The rotary valve 100 comprises a valve house 110 and a plug 150.

The valve house 110 comprises a fluid inlet 120 which can take many different shapes depending on the system to which it is to be connected. Thus, the function of the fluid inlet 120 is to allow connection of the rotary valve 100 to a fluid container 10 (not shown) from which it is to block or release a fluid.

The valve house 110 further comprises a fluid outlet 140. The fluid outlet 140 can also take various shapes such as varying diameter and length. In a preferred embodiment, the fluid outlet 140 is long enough to allow the user to rest a finger under it without having any of the fluid spill onto said finger. Furthermore, in a preferred embodiment of the invention, the opening 142 of the fluid outlet 140 is angled to improve the user control of the fluid flow.

The house body 130 of the valve house 110 encircles a plug 150. Said plug 150 can be rotated within the valve house 110 (illustrated by the arrow A) to open or close the fluid flow through the rotary valve 100. In different embodiments of the invention, it may be varied which direction of rotation opens or closes the valve just as the degree of rotation necessary to change the state of the rotary valve may vary from around 20 degrees to around 180 degrees.

In a preferred embodiment of the invention, both components of the two-component rotary valve 100 are produced from one or more materials that can be injection-moulded, e.g. various types of plastic. In some embodiments, both of the components of the two-component rotary valve 100 may be produced from the same material. In other embodiments of the invention, they are produced from different materials. Similarly, the invention is not restricted to have all parts of either the valve house 110 or the plug 150 be made of the same material.

FIG. 3*a* shows the valve house 110 of the rotary valve 100 alone without the plug 150 mounted within it.

In addition to the fluid inlet 120 and fluid outlet 140 shown in FIG. 2, it is now possible to see some of the potential features of the house body 130.

The inner opening of the fluid inlet 124 and the inner opening of the fluid outlet 144, respectively, may as shown have a different cross section than the outer opening of the fluid inlet 122 and outer opening of the fluid outlet 142, respectively. In other embodiments, they may have the same cross section, or they may take any form as long as the fluid flow is possible through the valve, when it is open.

The valve house 110 may comprise one or more stopper protrusions 135, 135' that help control the movement of the plug 150 within the valve house 110 when changing the state of the valve 100 from open to closed. Such stopper protrusions may take many different shapes and may be placed on either the fluid inlet 120, the body of the house 130, or the fluid outlet 140 to accommodate the shape of the lever 180. A stopper protrusion 135, 135' will hamper the movement of the plug 150 by being in contact with some part of said plug 150. It will often be the lever 180 that will come in contact with a stopper protrusion 135, 135', but it could be any part of the plug 150 including a protrusion on the plug 150 itself, designed with the purpose of interacting with a stopper protrusion on the valve house 110. A stopper protrusion 135, 135' can be big enough to stop the motion of the plug 150 completely. Alternatively, a stopper protrusion may be so small that it will only hinder the motion of the plug 150 partially, thereby minimising the risk of unintentional rotation, but still allowing a user to rotate the plug 150 past the stopper protrusion when intending to open or close the valve 100 simply by exerting a bit more force. A stopper protrusion 135' can also be part of the existing design such as a part of the fluid inlet 120.

In addition to the inner opening of the fluid inlet 124 and the inner opening of the fluid outlet 144, the inside house wall 136 may comprise various types of structuring in the form of sealing lips 165 and/or sealing grooves 166. In the embodiment illustrated in FIG. 3a, the sealing feature takes the form of a ring around the inner opening of the fluid outlet 144 (a similar ring is present around the inner opening of the fluid inlet 142 although not visible in the perspective of the figure). The number and size may vary just as the inside house wall 136 may comprise only sealing lips 165, only sealing grooves 166, or a combination of both.

In another embodiment, the sealing lips 165 and sealing grooves 166 will be running longitudinally along the length of the house body 13. They may follow the entire length of the house body 130, but in other embodiments they may be present in only parts of the length of the house body 130. In other embodiments, the sealing lips 165 or sealing grooves 166 may be running around the circumference of the inside house wall 136. In some embodiments, both directions of sealing lips 165 and sealing grooves 166 may be present.

In a preferred embodiment, the house body 130 is a tube with openings at the first 132 and second ends of the house body 134. In other embodiments, at least one end of the house body is closed off by being cast with a bottom (not shown) which creates a fully tight seal. In such an embodiment, where the second end of the house body 134 is closed completely, the inside house wall 136 may comprise a flange groove 137, i.e. an undercut in the inside house wall which can receive a flange on the plug 150 ensuring that said plug cannot be removed accidentally from the valve house 110. Such a securing mechanism, which hinders the plug 150 from being released from the valve house, may also take the form of a protrusion on the bottom of the house body 130, e.g. a flange or taps in the inside house wall fitting with a groove or indents made in the outer plug wall 160.

In yet another embodiment, the house body will be cast with fully closed surfaces at both the first 132 and second ends of the house body 134 which is then cast around the plug 150. In such an embodiment, the house body 130 comprises at least one through-going lever slot in the side of the wall that allows the lever 180 of the plug 150 to protrude from the enclosure of the house body 130, so that the plug 150 can still be turned within the valve house 110.

In the embodiment illustrated in FIG. 3a, where both the first 132 and second ends of the house body 134 are open, said first 132 and second ends of the house body 134 may comprise end sealing lips 165', 165" (not shown in FIG. 3a, see FIGS. 7a-7e). Such end sealing lips 165', 165" may be considered a change in the inner radius (R) of the inside house wall 136 near the first 132 and second ends of the house body 134, respectively. In a preferred embodiment, said change in the inner radius (R) will be accompanied by a change in the thickness of the wall of the house body 130, i.e. also a change in the outer radius (r). In other words, the end sealing lips 165', 165" may be considered a sealing lip 165 protruding from the end surface of the first 132 and second ends of the house body 134, respectively. In such an embodiment of the invention, the flange 153 of the plug 150 will comprise a matching sealing groove 166 for receiving the end sealing lip 165' and creating a fluid seal that will remain tight regardless of whether the rotary valve is open or closed, as it is unaffected by the rotary position of the plug 150 in relation to the valve house 110.

Similarly, the end of the first 132 and second ends house body 134 may comprise the end sealing grooves 166', 166", while the flanges 153, 153' of the plug 150 may comprise the end sealing lips 165, 165". Such sealing means may be presented in combination with the sealing means of sealing lips 165 and grooves 166 arranged in a ring around, i.e. encircling, the inner opening of the fluid inlet 124 and the inner opening of the fluid outlet 144 (see FIGS. 16a-16d for an illustration of the combined features).

FIG. 3b shows an embodiment of the plug 150 of the rotary valve 100 alone without the surrounding valve house 110. The plug 150 comprises a tube 152 with a thorough-going opening channel 170. When the rotary valve 100 is open, the opening channel 170 is positioned such that it is at least partially in line with the fluid inlet 120 (not shown) and fluid outlet 140 (not shown) of the valve house 110 (not shown), such that the fluid may pass from said fluid inlet 120 through the opening channel 170 to said fluid outlet 140.

The cross-sectional area of the opening channel 170 may vary for different embodiments of the invention. In a preferred variant, the cross-sectional area is similar to that of the respective inner openings of the fluid inlet 124 and the fluid outlet 144, but in other embodiments of the invention the cross-sectional area of the opening channel 170 can be either smaller or larger than those. Similarly, the cross section may have any shape so long as it allows the flow of a fluid through the opening channel 170. It could for example be oval, circular, square or have a changing cross section along the length of the opening channel 170.

The plug 150 itself may be hollow aside from the side-walls of the opening channel 170 to decrease the weight of the rotary valve 100. In another embodiment of the invention, the plug 150 needs not be hollow aside from in the opening channel 170. The plug 150 may be solid or partially hollow with stabilising structures inside.

Figures 4A, 4B, 4C:
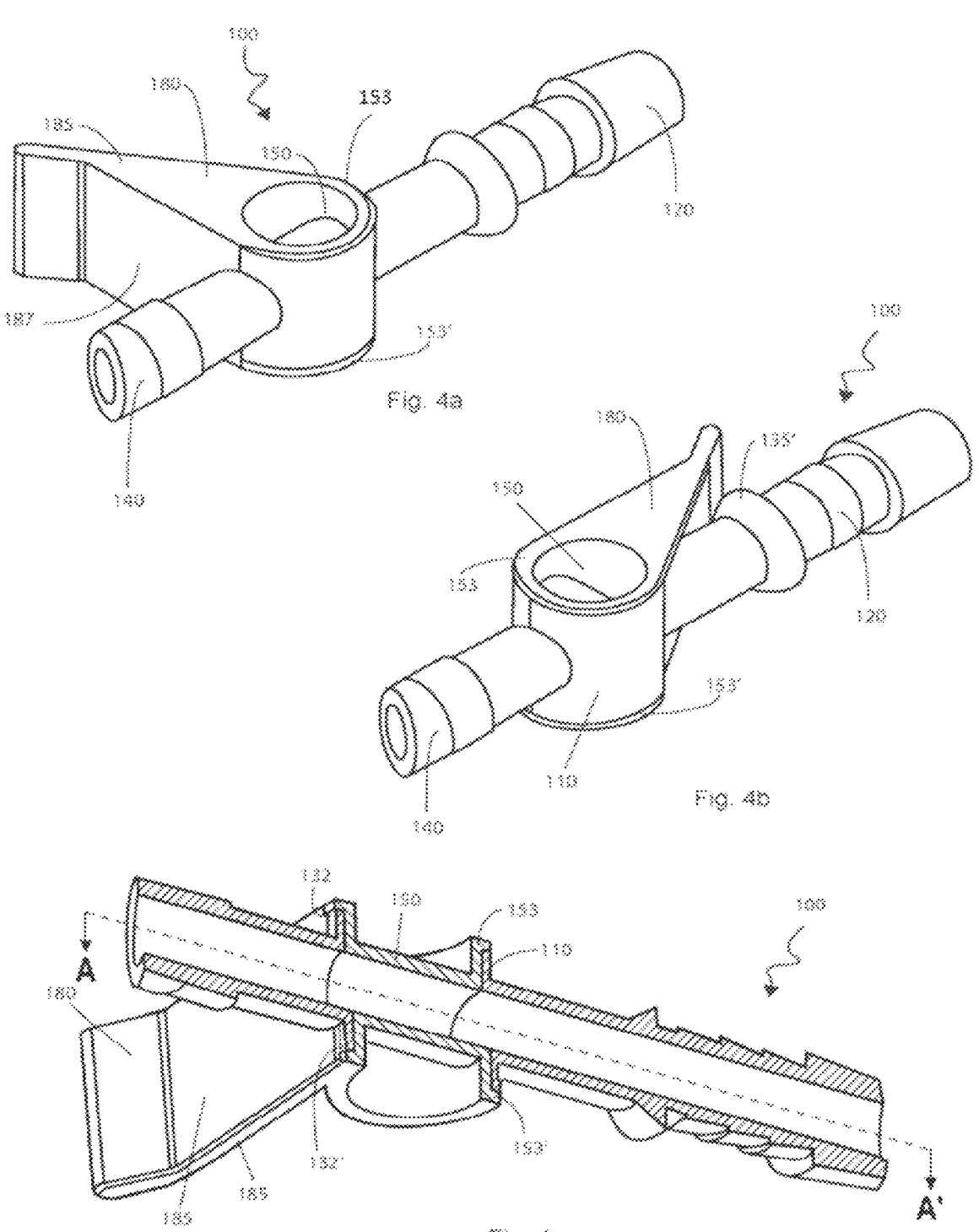
FIGS. 4a-4c illustrate a variant of the invention in which the lever is attached to both ends of the plug shown in different ways.

The plug 150 further comprises a lever 180. The lever 180 provides a grip for the user allowing easy rotation of the plug 150 within the valve house 110 (not shown), as it creates leverage for applying a torque to the plug 150. The specific shape of the lever 180 may vary between different embodiments of the rotary valve 100. In an embodiment of the invention, the lever 180 may be attached to one end of the plug tube 152 and flange 153 as shown in FIG. 3b. In other embodiments of the invention, the lever 180 may be attached to the plug tube 152 at both ends through both flanges 153, 153' as shown in FIGS. 4a-4c. As shown in FIG. 3b, the lever 180 may have a grip 181 being an end part with a slightly different angle than the rest of the lever 180 to make it easier for the user to hold on to while operating the rotary valve 100. A further advantage of such a grip 181 is that it may accommodate the shape of the valve house 110 allowing a bigger lever 180 without impeding the desired movement of the plug 150. In other embodiments, such a grip 181 may be longer or shorter than illustrated in FIG. 3b or not present at all. Similarly, the lever 180 may have a horizontal stabilizer part 185 capable of moving across the fluid inlet 120 or fluid outlet 140 of the valve house (not shown). In other embodiments, the horizontal stabilizer part 185 may take different shapes than the one shown in FIG. 3b just as it may be omitted or be a mesh of the material used for the plug 150 rather than being a solid structure. The lever 180 may also comprise a vertical stabilizer part 187 extending next to the valve house 110 and making the lever 180 less fragile. Just as for the horizontal stabilizer 185, the vertical stabilizer 187 may take different shapes than the one shown in FIG. 3b just as it may be omitted or be a mesh of the material used for the plug 150 rather than being a solid structure. In embodiments of the invention, where the lever 180 is connected to both of the opposing ends of the plug tube 152, the vertical stabilizer 187 may connect two horizontal stabilizers 185 (see FIGS. 4a-4c).

Although the two stabilizer parts 185, 187 have been named horizontal and vertical, they should not be restricted to be perpendicular to each other. They may be placed at any angle that does not unintentionally impede the rotation of the plug 150 within the valve house 110. They may be the parts that are to interact with a stopper protrusion 135, 135' to impede the rotation intentionally at a specific point or through part of the rotation.

Although not shown in the illustrated embodiment of the plug 150, other embodiments of the plug 150 may be equipped with other protrusions designed for stopping the rotation of the plug 150, when it is in the fully opened or fully closed positions. Such a protrusion may be part of the lever 180 or may be placed on one of the flanges 153, 153'.

In a preferred embodiment of the invention, the plug 150 is equipped with two flanges 153, 153' placed at both of the opposing ends of the plug 150. These flanges 153, 153' prevent the plug from being removed from the valve house thus eliminating the risk of the plug 150 being dropped or the opening channel 170 being translationally misaligned with the fluid inlet 120 and fluid outlet 140 of the valve house 110.

Furthermore, the flanges 153, 153' may comprise end sealing lips 165' or end sealing grooves 166' (not shown in FIG. 3*b*, see FIGS. 7*a*-7*e*). The flanges 153, 153' improve in combination with end sealing grooves 166' or end sealing lips 165' on the house body 130 the sealing of the rotary valve both in the open and the closed configurations of the valve.

The flanges 153, 153' may be rings at the edge of the plug 150 as shown in FIG. 3, or they may take different geometries, e.g. a full plate at the ends of the plug 150 or rounded surfaces or domes on said ends.

Moreover, the flanges 153, 153' may be on either side of the house body 130 engaging with the first 132 and second ends 134 of said house body 130. In other embodiments, however, one or both flanges may be extending into a flange groove 137 in the inside wall 136 of the house body 130 (not shown). Said flange groove 137 enables the rotation of the plug 150 within the valve house 110, while it acts as a seal. In embodiments where a flange 153 is in a flange groove 137 inside the house body 130, said house body 130 (not shown) may be closed off making it leak-proof at that end.

In some embodiments, the outside of the wall 160 of the plug 150 may comprise one or more sealing lips 165, sealing grooves 166, or a combination of both. Such sealing lips 165 or sealing grooves 166 may take the form of a ring placed around each end of the opening channel as illustrated in FIG. 3*b*. In other embodiments of the invention, there may be additional sealing lips 165 and/or sealing grooves 166 which may be circles or take other forms such as lines following the contour of the plug wall 160 or running along the plug wall 160 parallel to the central axis of the plug 150.

In FIGS. 2, 3*a*, and 3*b*, the rotary valve 100 is fitted with a lever 180 which is attached only on one end of the plug. This is a possible embodiment of the invention allowing a very compact design. However, in other embodiments of the invention, the lever 180 may constructed differently allowing it to be attached at both of the opposing ends of the plug 150. Examples of such other embodiments are illustrated in FIGS. 4*a*-4*c*.

FIGS. 4*a* and 4*b* show an embodiment of the rotary valve 100 with a lever 180 attached to both of the opposing ends of the plug tube 152 in an opened or closed configuration, respectively.

In the illustrated embodiment of the lever 180, each of the flanges 153, 153' of the plug 150 is moulded such that they each extend into a horizontal stabilizer part 185, 185'. These two horizontal stabilizer parts 185, 185' are connected to each other by a vertical stabilizer part 187 which extends along the plug tube 152. There is a gap between the vertical stabilizer part 187 and the plug tube 152 such that the plug 150 may be rotated within the valve house 110 without being hampered by friction between the vertical stabilizer part 187 and the outside of the valve house 110. However, the valve house 110 may comprise stopper protrusions designed to limit or hamper the rotational movement of the plug 150 relative to the house body 110 through impact between the stopper protrusion 135 and the lever 180, e.g. the vertical stabilizer part 187.

Both the horizontal stabilizer parts 185, 185' and the vertical stabilizer part 187 may be solid pieces of material, but they may also take any other form such as a grid structure providing mechanical strength while being light-weight, or a hole structure may provide a logo or markings that function as tactile aids for users with impaired vision without decreasing the benefits of the wide lever 180 which is attached to both of the opposing ends of the plug 150.

It is noted that the nomenclature of horizontal and vertical stabilizers should not be seen as limiting to orientation but simply be considered as identifying names. In a preferred embodiment, the horizontal stabilizer parts 185, 185' are parallel to the flow of liquid through the opening channel 170, and the vertical stabilizer part 187 is perpendicular to this. However, they should not be considered restricted in relation to each other, as all of the mentioned parts may have varying shapes in various embodiments of the invention, e.g. the opening channel 170 may be angled to allow flow from a fluid inlet 120 to a fluid outlet 140 the central axes of which are not aligned, or the horizontal stabilizer parts 185, 185' may include a step or a rounded indent providing a comfortable resting place for the user's fingers, and the vertical stabilizer part 187 may comprise multiple sections at different angles relative to the horizontal stabilizer parts 185, 185' and to each other. This is also the case for embodiments of the rotary valve 180, where the lever 180 is connected to one end of the plug 150 only and thus only comprises a single horizontal stabilizer part 180.

As for the previously described embodiment of the rotary valve 100, the lever 180 may comprise a grip 181 also in the embodiments of the invention, where the lever 180 is connected to both of the opposing ends of the plug 150. Such a grip 181 makes the lever 180 easier to operate and may additionally be the part of the lever designed to interact with one or more of the stopper protrusions 135, 135', 135''.

FIG. 4*c* shows a cross-sectional view of the rotary valve 100 in an embodiment of the invention, where the lever 180 is attached to both of the opposing ends of the plug 150. The rotary valve is shown in the open configuration, where the opening channel 170 of plug 150 connects the fluid inlet 120 of the valve house 110 to the liquid fluid 140. The plug 150 comprises flanges 153, 153' at the each of the opposing ends of the plug 150. These flanges 153, 153' envelop the first 132 and second end of the house body 134 thus contributing to a secondary seal that ensures that no leakage can happen should fluid enter the space between the outer plug wall 160 and the inside house wall 136. The lever 180 is attached to/extends from both of the flanges 153, 153' at the opposing ends of the plug 150. The lever 180 is a single piece comprising the horizontal stabilizer parts 185, 185' attached to the flanges 153, 153' and a vertical stabilizer part 187 connecting the horizontal stabilizer parts 185, 185' outside the valve house 110.

FIGS. 5*a*-5*f* show the rotary valve 100 from a direction of the second end of the house body 134 towards the first end of the house body 132 cut at a height of the centre of the opening channel 170 to give a cross-sectional view of the mechanism, as the rotary valve 100 is opened and closed, respectively. Illustrations of three different embodiments of the rotary valve 100 are presented in closed and open configurations, respectively.

Figure 5A:
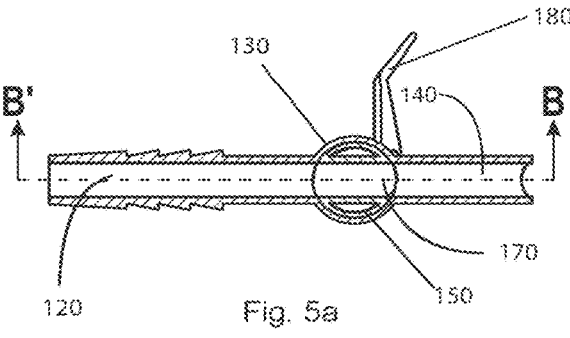
FIGS. 5a-5d are cross-sectional views along the length of open and a closed rotary valves, respectively, according to a variant of the invention, where the lever is rotated by approximately 90 degrees to change state from fully open to fully closed.
Figure 5B:
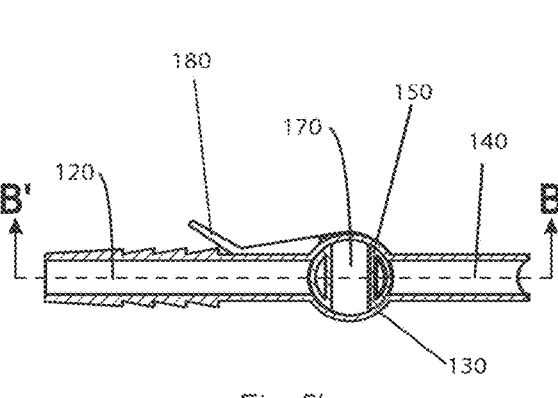

FIGS. 5a-5b are illustrations of a rotary valve 100, where the fluid inlet 120 and fluid outlet 140 are placed centrally compared to the house body 130. The grey structure is the wall of the valve house 110, where it is cut by the cross section. In a preferred embodiment of this variant, the opening channel 170 of the plug 150 is effectively perpendicular to the fluid inlet 120 and fluid outlet 140, when the rotary valve 100 is closed as illustrated in FIG. 4b. In other embodiments, the angle between the opening channel 170 and the fluid inlet 120 and fluid outlet 140 may be either bigger or smaller in the closed configuration. In the illustrated embodiment, the lever 180 is placed along the fluid inlet 120 when the rotary valve is closed.

FIG. 5a shows the rotary valve 100, where the fluid inlet 120 and fluid outlet 140 are placed centrally compared to the house body 130 in the open configuration of the rotary valve 100. When the valve is open, the opening channel 170 of the plug 150 connects the fluid inlet 120 to the fluid outlet 140 thereby allowing a fluid to pass through the rotary valve 100. In the illustrated embodiment of the valve, the lever 180 will be protruding away from the direction of fluid flow through the rotary valve 100 in the open configuration of said rotary valve 100. In this way, accidental nudging of the lever 180 will lead to closing off of the rotary valve 100.

Figure 5C:
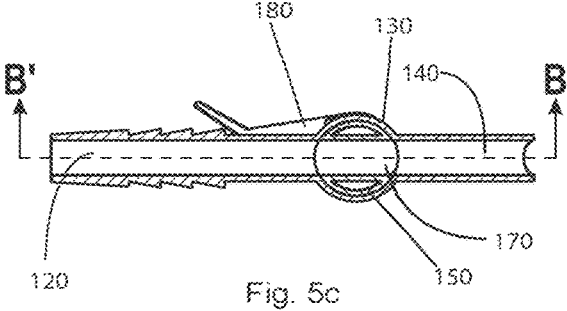
Figure 5D:
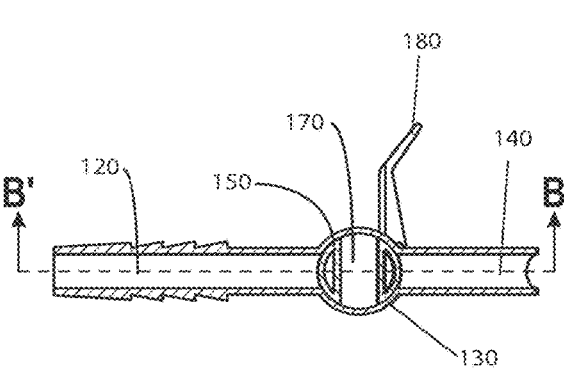

FIGS. 5c-5d show an embodiment of the rotary valve which—like the variant shown in FIGS. 5a-5b—have the fluid inlet 120 and fluid outlet 140 placed centrally in regard to the house body 130.

FIG. 5c shows an embodiment, where the lever 180 is placed along the fluid inlet 120, when the rotary valve 100 is in the open configuration, where the opening channel 170 of the plug 150 is aligned with the fluid inlet 120 and fluid outlet 140 so that fluid may pass through the rotary valve 100.

Although the embodiments shown in FIGS. 5a-5d show a rotation of 90 degrees, the lever 180 and the opening channel 170 may be configured such that the lever 180 is at an angle to the fluid inlet 120 in both the open and in the closed configurations. Similarly, the lever 180 may be constructed such that it is along the fluid outlet 140 rather than along the fluid inlet 120 as in the case of FIG. 5b and FIG. 5c.

FIG. 5d depicts an embodiment of the rotary valve 100, where the lever 180 is protruding substantially perpendicular to the fluid inlet 120 and fluid outlet 140, when the rotary valve 100 is in the closed configuration. Such a configuration has the benefit of offering the user an easy grip when needing to open the rotary valve 100 such that it is quickly opened and the uncontrolled flow through a partially aligned opening channel 170 is minimised.

Figure 5E:
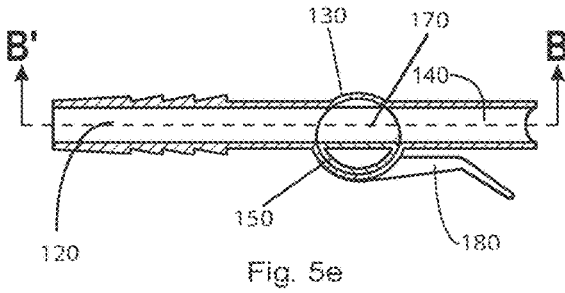
FIGS. 5e-5f are cross-sectional views along the length of open and closed rotary valves, respectively, according to a variant of the invention, where the lever is placed along the fluid outlet of the valve house, when the rotary valve is open, and along the fluid inlet, when the rotary valve is closed.
Figure 5F:
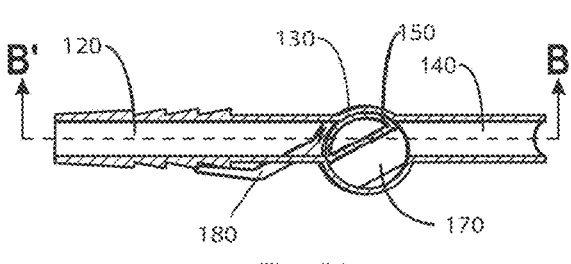

FIGS. 5e-5f are cross-sectional illustrations of a rotary valve 100 cut along the length of said rotary valve 100, where the fluid inlet 120 and fluid outlet 140 are placed excentric in regard to the house body 130. This off-centre placement of the fluid inlet 120 and fluid outlet 140 allows an increased rotation distance from the closed to the open configuration of the valve compared to the variant shown in FIGS. 5a-5d. Thus, in the closed configuration, the opening channel 170 is at an angle to the direction of fluid flow through the rotary valve 100 in the open configuration. The exact placement of the fluid inlet 120 and the fluid outlet 140 may vary between embodiments, so that they may be shifted from the centre position by a bigger or smaller amount. In yet other embodiments, the fluid inlet 120 and fluid outlet

140 may be placed at an angle compared to each other rather than being in line with each other.

As shown in FIG. 5e, the opening channel 170 of the plug 150 connects the fluid inlet 120 to the fluid outlet 140, when the rotary valve 100 is in the open configuration.

In a preferred embodiment of the rotary valve 100 configured with excentric fluid inlet 120 and fluid outlet 140, the lever 180 is placed along either the fluid inlet 120 or the fluid outlet 140 in both the open and the closed configuration. When the plug 150 is rotated to change the rotary valve 100 from the closed to the open state, the lever 180 is moved slightly 180 degrees so that in the open position it will be along the fluid outlet 140 and in the closed position it will be along the fluid inlet 120 or vice versa.

The excentric version of the rotary valve 100 has the benefit that it is compact in both the open and the closed state. Furthermore, it is unlikely that the lever being parallel to the fluid inlet 120 or fluid outlet 140, respectively, will be caught on something and accidentally be opened or closed.

In the embodiments of the rotary valve 100 illustrated in FIGS. 5a-5f, the cross section of the house body 130 and the plug tube 152 is circular to lower the force required to turn the plug 150 within the valve house 110, and the other seals are relied upon to ensure that the rotary valve 100 does not leak.

FIGS. 6a-6d show embodiments of the rotary valve 100 having mutually oval cross sections of the house body 130 and the plug tube 152. In different embodiments of the invention, the difference between the axes of the transverse section may vary between embodiments to make the ovality more or less pronounced. In a preferred embodiment, the ratio of the longest diameter to the shortest diameter is between 1.01 and 1.3. In an even more preferred embodiment of the invention, the longest diameter is between 1.03 and 1.06 times larger than the shortest axis.

In an example embodiment of the invention, the average diameter of the oval house body 130 and plug 150 is 13 mm, while the difference between the long diameter and short diameter will range from 0.1 mm to 0.5 mm.

In a preferred embodiment, the orientation of the oval is such that the longer side faces the fluid inlet 120 and the fluid outlet 140, when the rotary valve 100 is open. This geometry helps minimise leakage in the open state, as the smaller curvature makes it less likely to have deviation between the house body and the plug tube 152. Such a deviation in the curvature would increase the magnitude of the potential clearance space between the valve house 110 and plug 150 and increase the risk of leakage.

It is to be understood that the oval cross section of the house body 130 and plug 150 may be used in combination with any of the embodiments of the rotary valve 100, i.e. along with the various sealing means and rotations necessary to open and close the rotary valve 100.

Figure 6A:
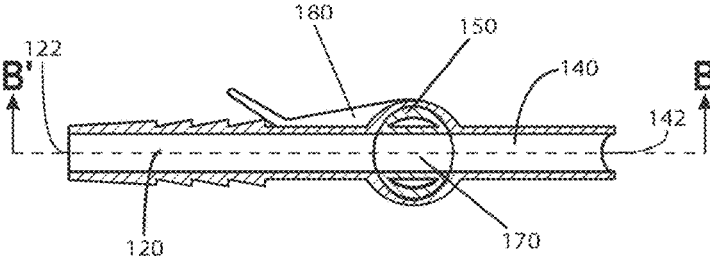
FIGS. 6a-6b are longitudinal cross-sectional views of a rotary valve according to the invention shown for an open and a closed rotary valve with oval house bodies, respectively.

FIG. 6a shows a cross-sectional view along the length of an open rotary valve 100 according to the invention. The plug 150 has been rotated so that the opening channel 170 is aligned with the fluid input 120 and fluid output 140, whereby a fluid flow through the rotary valve 100 is enabled. In this situation, a fluid enters the rotary valve 100 at the outer opening of the fluid inlet 122, traverses the rotary valve 100 through the opening channel 170, and exits the valve through the outer fluid opening of the outlet 142. The valve house 110 is shown in grey, where it is cut by the cross section to help distinguish the parts.

It is foreseen that other embodiments of the invention may have a different relative angle of the opening channel 170 and the lever 180, so that the position of the lever 180 would be different, when the rotary valve 100 is open. Similarly, it is foreseen that the lever 180 itself may take many different shapes including being longer, shorter or having a different thickness as well as including various sorts of bends along its length. In the illustrated embodiment, however, the rotary valve 100 is fully open, when the lever is placed along the fluid inlet 120.

Figure 6B:
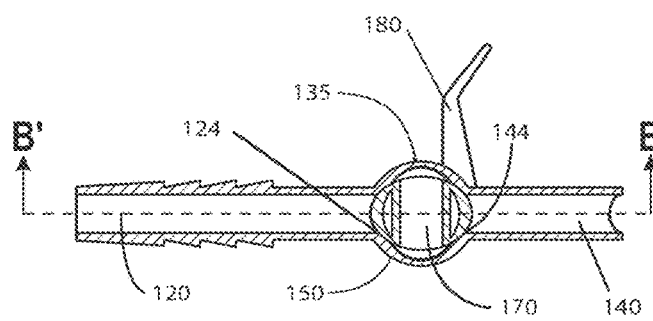

FIG. 6b shows a cross-sectional view of a closed rotary valve 100 according to an embodiment of the invention. The plug 150 has been rotated such that the opening channel 170 is oriented across the direction of fluid flow through the open rotary valve 100. In a preferred embodiment, the opening channel 170 is effectively perpendicular to said direction of fluid flow. In other embodiments, it can have any angle that does not lead to the ends of the opening channel 170 overlapping simultaneously with the inner opening of the fluid inlet 124 and the inner opening of the fluid outlet 144. The valve house 110 is shown in grey where it is cut by the cross section to help distinguish the parts.

The ovality of the plug 150 also contributes to the seal of the rotary valve 100 in the closed state as shown in FIG. 6b. Although it requires more force to change the valve from the open to the closed state, once the valve is in the closed state the ends of the oval plug 155' will protrude through the inner opening of the fluid inlet 124 and the inner opening of the fluid outlet 144. The shape of the plug tube 152 will press against the inside house wall 136 at the inner opening of the fluid inlet 124, the inner opening of the fluid outlet 144 thus creating a tight seal.

Figure 6C:
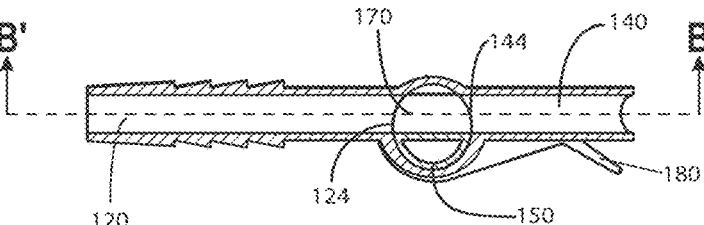
FIGS. 6c-6d are longitudinal cross-sectional views of a rotary valve according to the invention shown for an open and a closed rotary valve with oval house bodies, respectively.
Figure 6D:
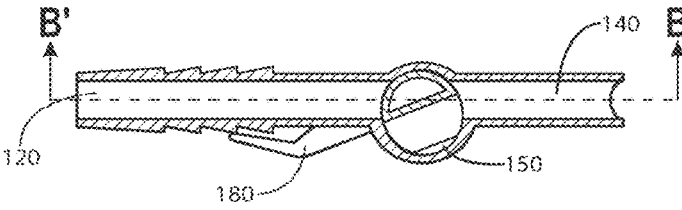

FIGS. 6c-6d show cross-sectional cuts along the length of an open rotary valve 100 according to an embodiment of the invention seen when looking from the second end of the house body 134 towards the first end of the house body 132. In this embodiment, the cross-sectional geometry of the house body 130 and plug tube 152 are oval and the fluid inlet 120 and fluid outlet 140 are placed excentrically with respect to the house body 130. Furthermore, in this embodiment the rotary valve is changed from the open to the closed configuration by turning the lever 180 from being placed along the fluid outlet 140 to being along the fluid inlet 120.

FIG. 6c shows the open configuration of the rotary valve 100, where the opening channel 170 is in line with the fluid inlet 120 and the fluid outlet 140 allowing a fluid flow through the rotary valve. Similarly to the embodiment, where fluid inlet 120 and fluid outlet 140 are placed centrally on the house body 130, the ovality offers larger curvature at the inner opening of the fluid inlet 124 and the inner opening of the fluid outlet 144 on at least one side of said openings, while the curvature on the other side will be similar to that of a rotary valve 100 with a circular cross section of the house body 130. This helps lessen the risk of leakage into a potential clearance space between the inside house wall 136 and plug wall 160.

FIG. 6d shows the closed configuration of the rotary valve 100, where the opening channel 170 is at an angle with respect to the fluid inlet 120 and the fluid outlet 140 such that the inner opening of the fluid inlet 124 is fully blocked and no fluid can pass through the rotary valve 100. In this configuration, the plug 150 is placed such that the longer end is pressed towards the inner opening of the fluid inlet 124 creating a tighter seal where the fluid is blocked.

FIGS. 7a-7e illustrate various embodiments of the end sealing lip 165' and its effect. The end sealing lip 165' may be incorporated in either or both the first 132 and second ends of the house body 134. Alternatively, the end sealing lip may be protruding from the flange 153, 153'.

FIGS. 7a-7b show cross-sectional views through the height of the rotary valve 100 made perpendicular to the fluid flow through the open rotary valve 100. In the shown embodiment, the rotary valve 100 comprises end sealing lips 165' at both the first 132 and second ends of the house body 134. Each end sealing lip 165' is protruding from/comprising the end of the house body 130 and is encased by the flange 153 of the plug 150 having an end sealing groove 166' in said flange 153 corresponding to the end sealing lip 165' on the house body 130. In various embodiments of the invention, such corresponding sealing lips 165' and sealing grooves 166' may be present in either, both or none of the ends 132/134 of the rotary valve 100. FIG. 7a shows the rotary valve 100 in the open configuration, while FIG. 7b shows it in the closed configuration. The valve house material has been illustrated in grey, where it is cut by the cross section to help distinguish it from the rest of the features.

Marked on FIG. 7a is the inner radius of the inside house wall (R) and the locally increased inner radius of the inside house wall (R') at the end of the house body, whereas FIG. 7b has the outer radius of the plug (T) marked as well as the two different locally increased outer radii of the plug (T', T"). Note that in the embodiment of the rotary valve illustrated in FIGS. 7a and 7b, the inner radius of the inside house wall (R) is equivalent to the outer radius of the plug (T) just as the locally increased inner radius of the inside house wall (R') is equivalent to the locally increased outer radius of the plug (T').

FIG. 7c shows a top view of the house body according to a variant of the invention. The end sealing lip 165' can be seen as protruding from the middle of the wall of the house body 130. An alternative way of viewing the end sealing lip 165' is as an increase of the inner radius (R) of the house body 130 to a larger inner radius (R') locally at the end region. Simultaneously, the outer radius (r) is decreased to a smaller outer radius (r') of the house body 110 leading to the thickness of the wall of the house body 130 being smaller at the end of said house body 132/134. In this figure, only the end sealing lip 165' has been greyed out to help distinguish it, although all of the shown structure in 6c is the house body 130.

The plug 150 is not shown in FIG. 7c, but it would reside inside the shown house body 130 having a matching outer plug radius (T) matching the inner house radius (R) and increasing to a larger outer plug radius (T') where the inner house radius (R') increases.

In another embodiment of the invention, the valve house 130 may have a sealing end groove 166' in place of the end sealing lip 165'. Just as yet other embodiments may have no end sealing lip 165' or end sealing groove 166'.

FIG. 7d illustrates an embodiment, where the ends of the house body 132/134 comprise end sealing grooves 166', and the flanges 153/153' comprise corresponding end sealing lips 165'. In this figure, only a part of the cross section is shown. The other side of the cross section is a corresponding symmetrical structure with the only difference that it may include the lever 180 as shown in FIG. 7a on the side not shown. Again, the material of the valve house 110 is shown in grey, where it is cut by the cross section to help distinguish the features.

If the valve house 110 is cast first and the plug 150 is cast as the second component inside it, the plug 150 will shrink inwards towards the centre of the structure in the direction illustrated by the arrows H,h. Such shrinkage will create a slight hollow 168 (not shown) on the side of the end sealing lip 165' facing away from the centre of the plug tube 152.

However, it will also pull the side of the end sealing lip 165' tighter towards the end sealing groove 166' on the side facing the centre of the plug tube 152 thus creating a leak-tight seal. This seal is rotationally symmetric around the end of the house body 132/134 ensuring that any fluid that may have gotten into a clearance space between the house body 130 and the plug tube 152 will not leak out of the rotary valve 100. The same principle applies to all of the end sealing means meaning that shrinkage towards the centre will create a slight hollow on one side and a tighter seal on the other. This hollow has not been shown in the illustrations of FIG. 7, as the slight hollow will be too small to distinguish easily on these figures even shown not to scale. Instead, the concept is illustrated in FIG. 13.

Similarly, the inward shrinkage of the plug 150 can also create a slight clearance or at least a decrease of the force between the outer plug wall 160 and the inside house wall 136. Such decrease of the contact force between the outer plug wall 160 and the inside house wall 136 also decreases the friction between the surfaces of the two components, when the plug 150 is turned inside the house body 130 to change the rotary valve 100 between the open and the closed position thus making it easier to turn. Primary sealing means 165, 166 may be on the plug wall 160 and/or inside the house wall 136 along with secondary end sealing means 165', 166'

The secondary end sealing means may be the flange itself 153 and/or end sealing means 165', 166' in the form of lips or grooves in the flange 153 and first 132 and second house end 134.

In a preferred embodiment, the rotary valve 100 has a primary sealing means 165, 166 on the inside house wall 136 and outer plug wall 160 in combination with secondary seals. Preferably, such secondary seals are in the form of flanges 153, 153' at both ends of the plug engaging the first 132 and second end of the house body 134, respectively. In an even more preferable embodiment, the rotary valve 100 comprises two secondary sealing means by including end sealing grooves 166', 166" in both of the first 132 and second end of the house body 134 and sealing lips 165', 165" protruding from both of the flanges 135, 135' on the side engaging the valve house 110. See FIGS. 16a-16d for illustrations of such embodiments.

Note that although the end sealing lips 165' in FIGS. 10b-10c are illustrated as being rounded, they may take any shape in other embodiments. Thus, they may be squares, steps or they may be rounded or comprise half-circles just as they may have different heights or widths. An end sealing lip 165' may—just as any other sealing lip 165—even have geometries involving steps or bends thus creating hook-like shapes or dovetails in the structure.

FIG. 7e shows a longitudinal cross-sectional view of one side of the valve house according to a variant of the invention, where the flange 153 of the plug 150 envelopes the edge of said house body 130. In this embodiment, the wall of the house body 130 acts effectively as a sealing lip 165, 165' regardless of whether there is an end sealing lip 165' or not. The house body 130 is illustrated in grey, where it is cut by the cross section to help distinguish it from the rest of the features. The other side of the rotary valve 100 not shown employs the same sealing mechanism. The only difference of the two sides is that the side not shown may comprise a lever 180 just as shown in FIG. 7a.

All the sealing structures of FIG. 7 are made with rotational symmetry similar to that shown in FIG. 7c. Hence the same type of end sealing lips 165' and end sealing grooves 166' are present all around the ends of the rotary valve 100.

FIGS. 8a-j show cross-sectional views for various embodiments of the rotary valve 100 showing examples of placement and type of sealing lips 165 and sealing grooves 166 created by local changes in the inner radius (R) of the inside house wall 136 and matching changes in the outer radius (t) of the outer plug wall 160. In all of the figures, the cross section is made along the length of the rotary valve 100 at a height of the centre of the opening channel 170. The lever 180 is never shown in spite of the fact that it may have parts in some embodiments that would be present at that height. Only a central region around the house body 130 and plug 150 is shown as the fluid inlet 120 and fluid outlet 140 do not influence the execution of these sealing means, but it should be understood that these are still a part of the rotary valve 100 for these embodiments. The exact sizes and placement of the sealing lips 165 and sealing grooves 166 are not to scale but are simply conceptual illustrations of some of the various possibilities. In all figures, the valve house 110 is shown in grey right at the cross-sectional cut to help distinguish the features.

Sealing lips 165 and sealing grooves 166 comprise local changes in the inner radius (R) of the house body 130 and corresponding changes for the plug 150. The sealing lips 165 and sealing grooves 166 are always made so that they interlock in the open position of the rotary valve 100. This is necessary as the rotary valve 100 is cast in the open position to allow the presence of a core (not shown) around which the rotary valve 100 can be moulded. The core protrudes through the fluid inlet 120, the opening channel 170, and the fluid outlet 140 and can be removed after the casting process is ended.

Figures 8A, 8B, 8C, 8D, 8E, 8F:
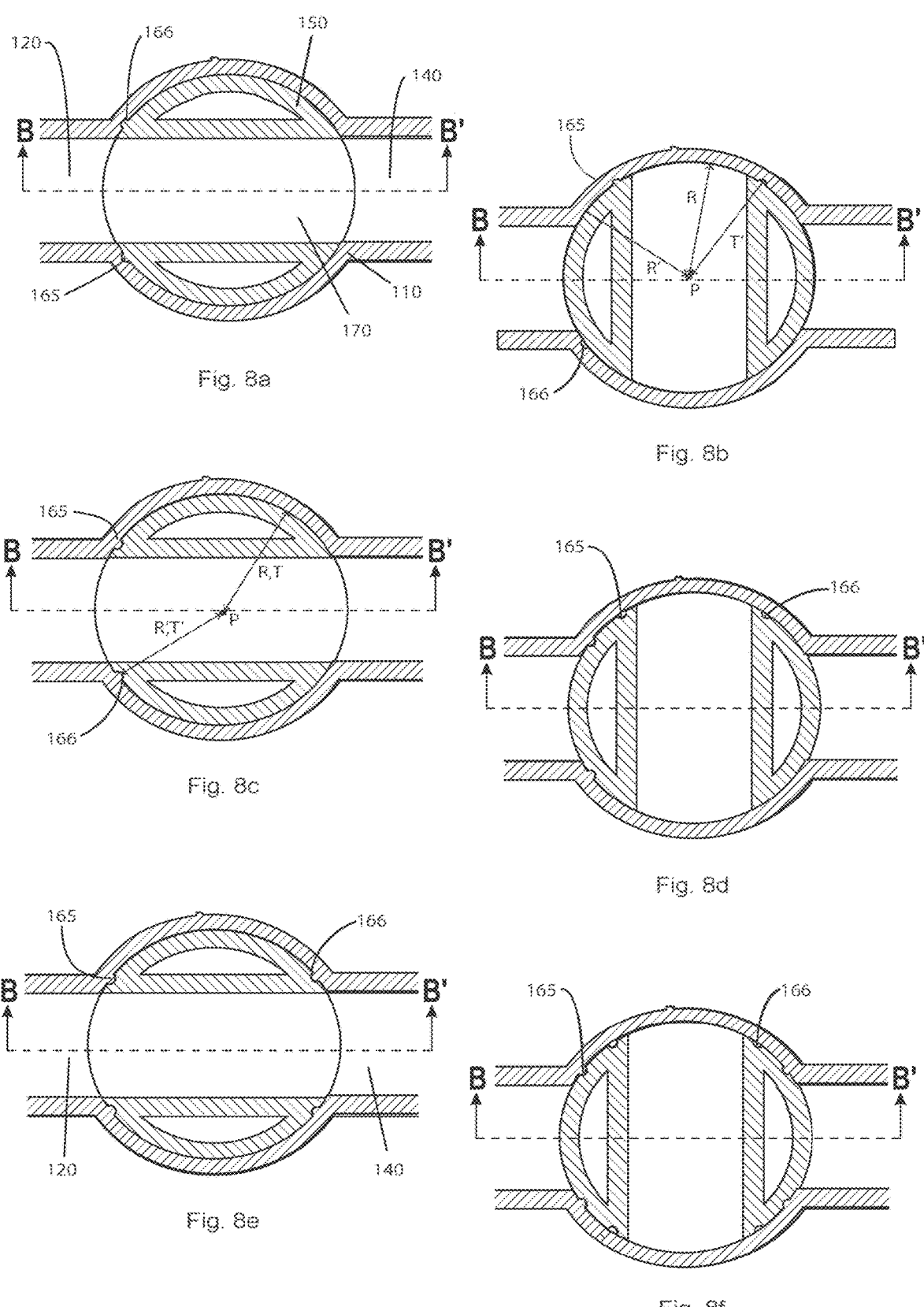

FIGS. 8a-8b show the rotary valve 100 with two lips on the plug 150 illustrated in open and closed configuration, respectively.

The two sealing lips 165 are cast in the outer plug wall 160, while the rotary valve 100 is open. This leaves a matching pair of sealing grooves 166 in the inside house wall 136. The interlocking sealing lips 165 and sealing grooves 166 will create a tight seal around the fluid inlet 120. The same type of structure could be made where the sealing lips are placed around the fluid outlet 140.

When the rotary valve 100 is closed, the sealing lips 165 will simply make contact with the inside house wall 136 at a position where there are no sealing grooves 166. The sealing lips will protrude with a small enough amount that it does not perturb the radius of neither the plug 150 nor the valve house 110 enough to cause any leaking, as no significant increase in the clearance space between the house body 130 and plug 150 will occur.

In FIG. 8b, the plug 150 is in such a rotary configuration relative to the house body 130 that the longest outer radius (T') of the outer plug wall 160 is longer than the shortest inner radius (R) of the inside house wall 136 and that these overlap at two angular positions, where the sealing lips 156 of the plug 150 press against the inside house wall 136. However, there will be other angular positions, where the outer radius (T) of the outer plug wall 160 is equal to the inner radius (R) of the inside house wall 136. At yet other angular positions, the inner radius (R') of the inside house wall 136 will be longer than the outer radius (T) of the outer plug wall 160, but the contact between the outer plug wall 160 and the inside house wall 136 at other angular positions ensures that the rotary valve is leak-tight in both the open and closed configurations even so.

FIGS. 8c-8d show a rotary valve 100 with two sealing lips 165 protruding on the inside house wall 136 illustrated in open and closed configurations, respectively. The inner radius (R) of the house body 130 is locally decreased to a smaller radius (R'), where the sealing lips 165 protrude from the inside house wall 136. The inner radius (R, R') is measured from the same point (P) and to the contour of the inside house wall 136. In FIG. 8c, the rotary configuration is shown where the contour of the inside house wall 136 matches the outer plug wall 160. In this case, the inner radius (R, R') of the inside house wall is equal to the outer radius (T, T') of the outer plug wall 160 for all rotary angles.

The two sealing lips 165 are cast in the inside house wall 136 on either side of the fluid inlet 120, while the rotary valve 100 is open. This leaves a matching pair of sealing grooves 166 in the outer plug wall 160. These sealing lips 165 and sealing grooves 166 are engaged, when the rotary valve is open thus creating a tight seal around the fluid inlet 120.

When the plug 150 is rotated to be in the closed position, the sealing lips 165 on the inside house wall 136 will remain on either side of the fluid inlet 120 and create a seal by pressing the peaks of said sealing lips 165 against the outer plug wall 160. This ensures that the fluid will not be able to enter any clearance gap there may be between the house body 130 and the plug 150. Thus, this embodiment offers a sealing effect of the sealing lips 165 in both the open and closed configurations of the rotary plug 100.

FIGS. 8e-8f show a rotary valve 100 with four lips protruding on the inside house wall 136 illustrated in open and closed configurations, respectively.

The four sealing lips 165 are cast in the inside house wall 136 in pairs placed on either side of the fluid inlet 120 and the fluid outlet 140, respectively, while the rotary valve 100 is open. This leaves two sets of matching pairs of sealing grooves 166 in the outer plug wall 160. These sealing lips 165 contribute to the leak-tight seal of the rotary valve 100 but in the open configuration where they interlock with the sealing grooves 166 and in the closed configuration where they press against the inside house wall 136 as shown in FIG. 8f. Having two sets of sealing lips ensures that no fluid can escape when moving from the fluid inlet 120 into the opening channel 170, or when the fluid moves from the opening channel 170 into the fluid outlet 140.

Although it has not been illustrated, such a configuration with two pairs of sealing lips 165 can also be created as sealing lips in the plug 150 similar to what has been shown in FIGS. 7a-7b. In this case, the sealing lips 165 will be placed in the plug 150 on either side of the opening channel 170 thus ensuring that the seals will be created in the right spots, when the plug 150 is moved to the open position.

FIGS. 8g-8h show a rotary valve 100 with four pairs of lips protruding on the inside house wall 136 illustrated in open and closed configurations, respectively.

In an embodiment of the invention, four pairs of protruding lips 165 are cast into the inside house wall 136. Two pairs are placed on either side of the fluid inlet 120 and the fluid outlet 140 as in FIGS. 8e-8f, and another two pairs are placed at the locations where the first pair ends up, when the rotary valve 100 is closed. For each sealing lip 165 protruding from the inside house wall 136, a matching sealing groove 166 will be formed in the outside plug wall 160. The placement of the sealing lips 165 and sealing grooves 166 is such that when the rotary valve 100 is rotated from the open to the closed position, the sealing lips 165 will move from engaging one set of sealing grooves 166 to engaging another pair of sealing grooves 166. This allows the interlocking of the sealing lips 165 and the sealing grooves 166 in all positions and gives the possibility of steeper and longer sealing lips 165 without perturbing the mutual shape of the plug 150 and valve house 110 when in a position where the sealing lips 165 engage a wall without a sealing groove 166.

Although it has not been illustrated, embodiments with such a configuration with four pairs of sealing lips 165 may also be created as sealing lips in the plug 150 similar to what has been shown in FIGS. 8a-8b. In this case, the sealing lips 165 will be placed in similar positions along the circumference of the plug 150/house body 130 simply on the other component.

In another embodiment, sealing lips 165 and matching sealing grooves 166 may be smaller and come as several seals spaced closely together along the periphery, e.g. a pair instead of a single sealing lip 165. Such a configuration may be beneficial, if each seal is not perfect. Then each sealing point may contribute to decreasing any fluid that may escape until no fluid gets into a potential clearance space between the house body 130 and the plug 150. Furthermore, such structure may offer a seal against leakage with a shallower sealing lip 165' that in turn will cause less resistance with regard to turning the seal, which may be important for users with low finger strength.

Such a configuration with multiple sealing lips 165 and sealing grooves 165 neighbouring each other may be applied in any position and could for example be used with any of the previously shown positions of sealing lips 165, just as they may be protruding from either the inside house wall 136 or the outer plug wall 160.

Although not shown, all of the mentioned embodiments may have any combination of sealing lips 165 and the inner house wall 136 and the outer plug wall 160 and vice versa. In other words, it is possible to make a combination, where there are sealing lips 165 and sealing grooves 166 on both the plug 150 and the valve house 110. For example, one could have sealing lips 165 in the inner house wall 136 around the fluid inlet 120 and have sealing grooves 166 in the inner house wall 136 around the fluid outlet. Alternatively, the rotary valve 100 may have a set of sealing lips 165 around the fluid inlet 120 followed by a set of sealing grooves 166 but in the inside house wall 136. Such construction ensures that a tight seal is achieved even if one of the constructions is more efficient than the other.

FIGS. 8i-8j show an embodiment of a rotary valve 100, where the opening channel 170 of the plug 150 is not perpendicular to the fluid inlet 120 and fluid outlet 140, when the rotary valve 100 is in the closed position, and where sealing lips 165 are protruding from the inside house wall 136.

Although the previous subfigures have all shown examples of sealing lips 165 for a rotary valve 100 with a rotation of 90 degrees, sealing lips 165 may be used as a sealing means for a rotary valve 100 with an arbitrary rotation required to change from the open to the closed state. Sealing lips 165 may be placed in the same manner to protrude around the inner opening of the fluid inlet 124 and the inner opening of the fluid outlet 144, respectively. However, just as for the other embodiments, the sealing lips 165 and sealing grooves 166 may be used in any number, shape or placement along the walls of the plug 150 and house body 130 also in embodiments where the necessary rotation to open or close the rotary valve 100 is more or less than 90 degrees. It is, however, necessary when doing a large rotation to keep in mind that the locations of the sealing lips 165 and the matching sealing grooves 166 must be chosen carefully so unwanted interaction does not take place between the open and the closed state of the rotary valve 100.

In general, the specific parameters of the sealing lips 165 and sealing grooves 166 may vary. For example, the size of the sealing lips 165 and sealing grooves 166 as well as the number of them and their placement may change between embodiments. Any combination of the shown embodiments or variations using different sealing lips 165 or sealing grooves 166 could be used for this type of sealing means. This includes, but is not limited to, using inside sealing lips 165 and sealing grooves 166 in combination with end sealing lips 165' and end sealing grooves 166' as well as in combination with the mutual ovality of the cross section of the house body 130 and plug tube 152.

FIGS. 9a and 9b illustrate cross-sectional views of the rotary valve in the open and closed configurations respectively. These cross sections are for a valve with circular sealing lips 165' on the inside house wall 136 encircling the fluid inlet 120 and fluid outlet 140, respectively. These sealing lips 165, 165' mate with sealing grooves 166, 166' on the outer plug wall 160 encircling the ends of the opening channel 170, when the rotary valve 100 is in the open configuration as shown in FIG. 9a.

When the rotary valve 100 is in the closed configuration as shown in FIG. 9b, the sealing lips 165, 165' will press against the outer plug wall 160 thus maintaining a fluid-tight seal.

FIG. 9c shows the valve house 110 separate from the plug. The inside house wall 136 comprises sealing grooves 166, 166' with which sealing lips 165, 165' of the plug 150 will engage, when the plug is in the open configuration. FIG. 9d shows separately the plug 150 that will match with this valve house 110. The plug 150 has sealing lips 165, 165' on the outer plug wall 160 encircling the ends of the opening channel 170. These sealing lips will press against the inside house wall 136 around the fluid inlet 120 and fluid outlet 140, respectively, when the rotary valve 100 is in the closed configuration thereby providing a sealing effect.

FIG. 10 illustrates that the sealing lips 165 may also come in different variants than the longitudinal structures shown in FIGS. 8a-8j. Specific embodiments of the rotary valve 100 may have any combination of the different sealing means described. This includes a combination of the longitudinal sealing lips from FIGS. 8a-8j and sealing lips with other orientations as well as sealing lips 165 on the outer plug wall 160 and the inside house wall 136 in combination with the end sealing lips 165'.

Note that these sketches are not to scale but simply illustrations of the concepts, for example the ratio of the thickness of the wall to the radius of the valve house 130 is unlikely to be as shown for a preferred embodiment of the invention. Similarly, the height of the sealing lips 165 is not representative of the size which such a structure would have in a preferred embodiment.

FIG. 10a shows a cross section of the house body 130 of the rotary valve cut along the height of the rotary valve 100 at the centre of a house body 130 perpendicular to the direction of fluid flow through the open rotary valve 100 thus showing the inner opening of the fluid inlet 122. Sealing lips 165 are protruding from the inside house wall 136 taking the form of rings along the periphery. As with the examples described and shown in FIGS. 8a-8j, the sealing lips 165 will have matching sealing grooves 166 on the plug 150. Furthermore, the sealing lips 165 may instead be on the plug 150 and there may be any combination or shape of said sealing lips 165 and corresponding sealing grooves 166. As illustrated, such sealing lips 165 in the form of bands may be placed at the ends of the house body 130 to ensure that no fluid, which had entered a clearance space between the house body 130 and plug 150, would be able to leak from the first or second end of the house body 130.

FIG. 10b illustrates an embodiment of the invention, where there is a combination of longitudinal and peripheral sealing lips 165 protruding from the inside house wall 136. Such structure having both longitudinal and peripheral sealing lips 165 requires a relatively steep sealing lip 165 to ensure a cut-off at the ends or a combination with several sealing lips ensuring that sealing lips 165 and sealing grooves 166 interlock both in the open and closed configurations, as with the embodiment illustrated in FIGS. 8g-8h, to ensure that leakage does not occur where the sealing lip changes direction.

FIG. 10c shows a longitudinal cross section through the centre of a house body 130 made perpendicular to the direction of fluid flow through the open rotary valve 100. A sealing lip 165 protrudes from the inside house wall 136 in a geometry encircling the inner opening of the fluid inlet 124. A corresponding ring of a sealing groove 166 will be in the outer plug wall 160. In such configuration, the sealing lip 165 and sealing groove 166 will be interlocking, when the rotary valve 100 is in the open state. A similar ring may be made around the inner opening of the fluid outlet 144. Additional sealing lips 165 and sealing grooves 166 shaped as rings of similar dimension may be made at other positions at a radial distance away corresponding to the rotation of the plug 150 necessary to change the rotary valve 100 from the open to the closed configuration. Similar to the embodiment illustrated in FIGS. 8g-8h, such multiple ring-shaped sealing lips 165 and sealing grooves 166 ensure that pairs of sealing lips 165 and sealing grooves 166 will be interlocked in both the open and the closed configurations of the rotary valve, respectively.

Just as for all other embodiments of the sealing lips 165 and sealing groves 166, it is possible to swap or combine on which of the two components the sealing lips 165 and sealing grooves 166 are placed.

FIG. 11a shows an end view of a plug 150, where the outer plug wall 160 comprises two conical sections 162, 162' creating a waist at the central height of the opening channel 170. In different variations of the invention, the angle of the conical sections may vary, and such variations may be between or within embodiments of the invention. In a preferred embodiment of the invention, the angles of the two conical sections will be similar, but they may be steeper in one embodiment than another. In other embodiments of the invention, one conical section 162 may have a different angle from the other 162'.

FIG. 11b shows a cross-sectional view of a valve house 110, where the inside wall 136 of the house body 130 comprises two conical sections matching those of the plug 150. Note that the outer shape of the valve house 110 is unaffected by the conical section of the inside house wall 136.

In a preferred embodiment of the invention, the valve house 110 with the hourglass inside house wall 136 will be cast first. It will experience shrinkage during the initial cooling, before the plug 150 is cast inside it thus obtaining the same hourglass shape as imparted by the inside house wall 136. As the plug 150 shrinks towards the centre of the structure, i.e. towards the waist of the hourglass shape, the outer plug wall 160 will press against the inside house wall 136 and will tighten the fluid seal around the opening channel 170. This is a seal which will remain tight for both the open and closed configurations of the rotary valve 100.

FIG. 11c shows a cross-sectional view directly perpendicular to the direction of fluid flow through the open rotary valve 100 with the plug 150 inside the valve body 110 for an embodiment of the invention, where the inside house wall 136 and outer plug wall 160 have two matching conical sections 162, 162' creating an hourglass shape.

FIG. 12a shows an end view of a plug 150 with a single conical section 162 spanning the entire height of the outer plug wall 160. In this configuration, the plug 150 comprises only a single flange 153 thereby controlling the direction of shrinkage to be towards this flange, as it cannot shrink inwards through the edge of the valve house 110. In a preferred embodiment of the invention, the flange 153 is placed in the end of the plug 150, where the conical section is the smallest, that is to say where local variations of the outer plug radius (T) are such that the outer plug radius (T) is the smallest.

Although not illustrated, the inside house wall 136 will have a matching conical section fitting around the plug 150 just as for the case of the hourglass embodiment, where there are two conical sections.

FIG. 12b shows a cross-sectional view directly perpendicular to the direction of fluid flow through the open rotary valve 100 with the plug 150 inside the valve body 110 for an embodiment of the invention, where the inside house wall 136 and outer plug wall 160 have a single conical section 162. The plug 150 comprises only a single flange 153. In a preferred embodiment of the invention, the valve house 110 is cast first and will shrink during curing, before the plug 150 is cast inside it. As the plug then shrinks, the direction of shrinkage will be limited by the single flange 153 ensuring that the shrinkage is in the direction of the smallest part of the conical section 162 thereby pressing the outer plug wall 160 against the inside house wall 136 and creating a tight seal.

It is to be understood that although other sealing features such as sealing lips, sealing grooves, and ovality of the plug 150 and valve house 110 have not been shown together with the conical sections 162, 162' in FIGS. 11a-11c and 12a-12b. This is simply for clarity, and any combination of the different sealing features is considered as various embodiments of the invention.

FIGS. 13a and 13b illustrate how the fact that the material of the rotary valve 100 shrinks after injection moulding can be used to increase the strength of a seal between an interlocking sealing lip 165 and a sealing groove 166 such as may happen for the end sealing lip 165' and end sealing lip 166'. The two-component rotary valve 100 is fabricated through a process of injection moulding which takes place in two steps. One component is injection-moulded first, and the second component is injection-moulded subsequently while using said first component as a mould. Both components will experience shrinkage, when the material cools down. The majority of this shrinkage will take place immediately after injection moulding, so the first component will be close to or will have reached its final geometry by the time it is used as a mould for the second component.

In case the valve house 110 is injection-moulded first, it will have shrunk the majority of the full shrinkage by the time it is used as a mould for the plug 150. In the illustrated example, the body 130 of the valve house 110 comprises a sealing lip 165, 165'. The plug 150 is moulded inside the body 130 and will be injection-moulded with a corresponding sealing groove 166, 166'. The side of the wall of the plug 130 facing the body 130 is shown with dashed lines to distinguish the two lines on the sketch more easily. A slight distance is shown between the valve house 110 and the plug 150 to allow them to be visually distinguished. In the actual two-component rotary valve 100, this clearance is minimised. In case the valve house 110 is cast first, this clearance can be minimised by casting the plug 150 in two subsequent bursts, where the first is larger than the second. In this way, by filling more material into the valve house 110, once the plug 150 has begun shrinking, the pressure on the plug 150 is increased from the inside, and the inwards shrinkage is slowed, so that the gap between the two structures is minimised.

Once the plug 150 has been moulded inside the valve house 110, it will shrink. The amount of this shrinkage may be controlled as described above, but it will shrink to some extent. If no measures are taken to control the shrinkage, it will happen in the direction towards the centre of the structure (illustrated by the arrows H,h). When this shrinkage takes place, the sealing groove 166 will shift slightly in the direction of shrinkage (arrow H). This shift will cause a slight hollow 168 to form on one side of the sealing lip 165. Simultaneously, any clearance on the other side of the sealing lip 165 will diminish, as the shrinkage pulls the inside of the sealing groove 166 even closer to the side of the sealing lip 165.

As described earlier in some embodiment of the rotary valve 100, there will be sealing lips 165 in either the house body 130 or the plug 150 thus creating seals with a part of the other component having no matching groove. Also in those cases, it is possible to have the shrinkage contribute to the strength of the seal by a component shrinking inwards (in the direction of arrow h) towards the other component.

Note that the drawing is made for illustrating the concept and is neither to scale nor indicative of the actual magnitude of the shrinkage which may vary for different materials and moulding conditions.

FIG. 14 illustrates the method of producing a two-component rotary valve 100 (not shown). The process used is injection moulding in two steps, where the valve house 110 is injection-moulded first, and the plug 150 is injection-moulded inside it using the house 110 as a mould, i.e. inner moulding. The process is illustrated by a flowchart of the main steps involved.

In the first step 210 of the process, the valve house 110 is injection-moulded. This is done in the open position, so that a core can be placed as a basis throughout the rotary valve 100 thus creating the channel through which the fluid flow will take place. Then the valve house 110 may be repositioned 215, i.e. moved and/or reoriented, to be in a suitable position for the second step 220. The step of repositioning 215 may be omitted if the valve house 110 is in the desired position immediately after production. The second step 220 is the injection moulding of the plug 150. The plug 150 is injection-moulded directly inside the valve house 110 which thus functions as a mould for the plug 150. The second step 220 of injection moulding the plug 150 may be divided into a first 221 and second part of the second step 222. In the first part of the second step 221, the plug 150 is cast inside the valve house 110 using the full amount of material to create a plug 150. The second part of the second step 222 is very similar and entails casting a further amount of the material for the plug 150 in the same manner. In the second part of the second step 222, a smaller amount of the material will be injected into the system. By injecting further material and thus topping up the structure, an increased pressure is supplied to the inside of the plug 150 which increases the pressure of the plug 150 towards the valve house 110 thus minimising any clearance between them. A waiting time passes between the first 221 and second part of the second step 222. In a preferred embodiment, the waiting time is between 1 and 60 seconds. In a more preferred embodiment, the waiting time is 5-20 seconds. In a yet more preferred embodiment, the waiting time is 7-12 seconds. The majority of the shrinkage will happen immediately after material has been cast, and it is favourable to apply the inside pressure, while the structure still has some softness/elasticity to it. The second injection of hot material taking place in the second part of the second step 222 will also contribute to softening the part of the plug 150 cast in the first part of the second step 221.

While the second part of the second step 222 contributes to decreasing any clearance between the outer plug wall and the inside house wall, some shrinkage of the plug will still take place. Such shrinkage of the plug away from the inside house wall leads to the rotation of the plug within the house body requiring less force than in the case of over moulding, where the valve house shrinks towards the plug instead. The decrease of required force follows from less friction between the surface areas of the outer plug wall in contact with the inside house wall. Decreasing the force necessary to rotate the plug within the valve house means that it is easier to change the rotary valve from the closed position to the open position and back again which will be helpful for users with motor difficulties or low finger strength. In some embodiments, the plug may be injection-moulded in a single shot 220 allowing the clearance to be larger than if a second injection 222 takes place. In a preferred embodiment, the second part of the second step 222 takes place to reinforce the primary sealing means on the inside house wall and outer plug wall.

Any clearance between the outer plug wall and inside house wall causes a risk of fluid entering the space between the house and the plug. Secondary sealing means prevents such fluid from leaking out of the rotary valve. In a preferred embodiment, the secondary sealing means take the form of flanges at both ends of the plug in combination with end sealing lips protruding from said flanges and engaging sealing grooves in the end faces of the house body. Whereas the shrinkage of the second shot component, i.e. the plug in the case of inner moulding, leads to decreased friction between the outer plug wall and the inside house wall, it increases the pressure between the flanges and the first and second ends of the house body. As previously described, shrinkage takes place towards the centre, i.e. its centre of mass. For the plug being cast through inner moulding, this means that it will shrink radially, i.e. the outer walls will shrink to decrease both the inner and outer radii. The end sealing lips on the flanges of the plug, which are engaging the end sealing grooves, will have the shrinkage blocked by said end sealing grooves. Hence, the shrinkage will exert a radial force towards the axial centre of the plug, when the plug shrinks, thus causing a leak-tight connection between end sealing lips and end sealing grooves.

The plug will shrink in height, i.e. in the coaxial direction around which the plug rotates or in other words in the direction perpendicular to the radius of the plug. This shrinkage will be hindered by the contact between the flanges of the plug and the first and second ends of the house body contacting said flanges. Hence, the shrinkage will cause a force to be exerted by the flanges on the first and second ends of the house body thereby creating a leaktight seal between the flanges and the house body.

Inner moulding of the plug inside the valve house leads to the shrinkage of the plug prestressing of flanges at both ends of the plug. There is no need for assembly of the plug and valve house after the two-step injection-moulding and the end seal or secondary seal of the flanges, as end sealing lips and grooves make the plug leaktight. Simultaneously, any clearance between the inside house wall and outer plug wall contributes to less force being required to turn the plug inside the valve house.

Between the first step 210 and the second step 220, some time (illustrated by the arrow S) passes. During this time, the valve house 110 cools down after having been injection-moulded, and during this cooling process said valve house 110 will undergo shrinkage. The majority of the shrinkage happens immediately after moulding, but it may continue to shrink at a lower rate after the time period (S) has ended. The potential repositioning 215 of the valve house 110 takes place within the time period (S).

After the second step 220, where the plug 150 is injection-moulded, there is another time period (illustrated by the arrow T), wherein the plug 150 cools off and where shrinkage of said plug 150 takes place. Once cooling of the injection-moulded material of the plug 150 has ended, the production is finished, and there are no further steps of assembly or post-processing of the rotary valve 100. Both components of the two-component rotary valve may continue to shrink after the illustrated steps of production.

Note that the lengths of the arrows T and S denominating the time periods are not representative of the length of said time periods.

FIG. 15 illustrates the method of producing a two-component rotary valve 100 (not shown). The process used is injection moulding in two steps, where the plug 150 is injection-moulded first, and the valve house 100 is injection-moulded around it using the plug 150 as a mould, i.e. over moulding. The process is illustrated by a flowchart of the main steps involved.

In the first step 310 of the process, the plug 150 is injection-moulded. This injection moulding is taking place around a core which defines the opening channel 170 of the plug 150 and will later define the hollow of the fluid inlet 120 and fluid outlet 140 of the valve house 110. This means that the rotary valve 100 will be cast in the open position. Then the plug 150 may be repositioned 315, i.e. moved and/or reoriented, to be in a suitable position for the second step 320. The step of repositioning 315 may be omitted, if the plug 150 is in the desired position immediately after production. The second step 320 is the injection moulding of the valve house 110. The valve house 110 is injection-moulded directly around the plug 150 which thus functions as a mould for the valve house 110.

Between the first step 310 and the second step 320, some time (illustrated by the arrow S) passes. During this time, the plug 150 cools down after having been injection-moulded, and during this cooling process said plug 150 will undergo shrinkage. The majority of the shrinkage happens immediately after moulding, but it may continue to shrink at a lower rate after the time period (S) has ended. The potential repositioning 315 of the plug 150 takes place within the time period (S).

After the second step 320, where the valve house 110 is injection-moulded, there is another time period (illustrated by the arrow T), wherein the valve plug 150 cools off, and where shrinkage of said plug 150 takes place. Once cooling of the injection-moulded material of the valve house 110 has ended, the production is finished, and there are no further steps of assembly or post-processing of the rotary valve 100. Both components of the two-component rotary valve 100 may continue to shrink after the illustrated steps of production.

Note that the lengths of the arrows T and S denominating the time periods are not representative of the length of said time periods.

Figures 16A, 16B, 16C, 16D:
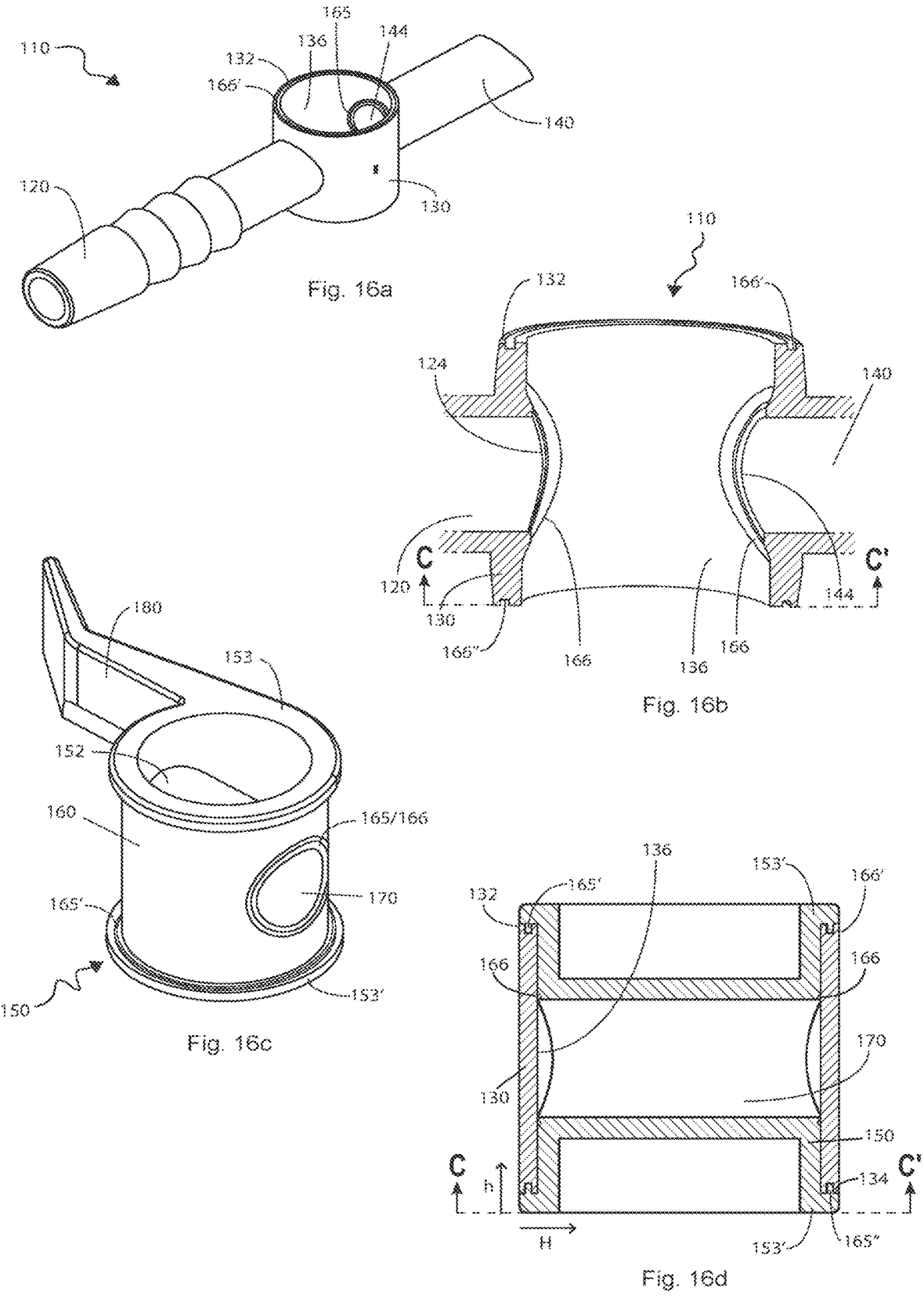

FIG. 16*a* shows an embodiment of the valve house 110, wherein the valve house 110 comprises multiple sealing means in combination. The valve house 110 comprises a sealing lip 165 protruding from the inside house wall 136 and surrounding the inner opening of the fluid outlet 144. While the sealing lip 165 may take any shape or be placed at a distance from the inner opening of the fluid outlet 144, in a preferred embodiment, the sealing lip 165 encircles the inner opening of the fluid outlet 144 following the edge of said inner opening of the fluid outlet 144 as illustrated in FIG. 16*a*.

While not visible in the perspective of FIG. 16*a*, in a preferred embodiment of the invention, the valve house 110 will also include a sealing means surrounding the inner opening of the fluid inlet (124 of for example FIG. 6*b*). Preferably such sealing means will be a sealing lip 165 encircling the opening of the fluid inlet arranged around the edge of said inner opening of the fluid inlet. In other embodiments, the sealing means in the inside house wall 136 may be a sealing groove 166 around either of or both of the inner fluid inlet 124 and/or the inner fluid outlet 144 being encircled by sealing grooves 166. In yet other embodiments, either the inner opening of the fluid inlet 124 or the inner opening of the fluid outlet 144 is surrounded or encircled by a sealing lip 165, while the other is surrounded or encircled by a sealing groove 166.

The sealing means on the inside house wall 136 and matching sealing means on the outer plug wall 160 (see FIG. 16*c*) is considered the primary sealing means. These primary sealing means are to prevent fluid from escaping the intended flow path through the fluid inlet 120, opening channel 170, and fluid outlet.

In a preferred embodiment of the invention, the rotary valve 100 comprises one or more secondary sealing means that avoid leaking of fluid from the valve in the event that any fluid has escaped the intended flow path and is present between the inside house wall 136 and the outside plug outer plug wall 160 (see FIG. 16*c*).

In the embodiments illustrated in FIGS. 16*a*-16*d*, the rotary valve 100 has two secondary sealing means. One such secondary sealing means is the flanges 153, 153' located at each end of the plug 150 and engaging the first 132 and second end of the house body 134, respectively. The contact between the flanges 153, 153' and the first 132 and second end of the house body 134 creates a seal against fluid leaking out of the rotary valve 100. Rotary symmetry of the secondary sealing means ensures that the seal remains engaged for all positions of the rotary valve 100, i.e. open or closed or while changing the state of the rotary valve 100 from open to closed.

The embodiments of FIGS. 16*a*-16*d* have a secondary seal in the form of end sealing grooves 166', 166" forming indents in the end faces of the first 132 and second end of the house body 134. These end sealing grooves 166', 166" engage end sealing lips 165', 165" in the face of the flanges 153, 153' of the plug 150 that contact the house body 130. The seal created by the end sealing lips 165', 165" and end sealing grooves 166', 166" have rotational symmetry enabling the seal to remain engaged for all positions of the rotary valve 100, i.e. open or closed or while changing the state of the rotary valve 100 from open to closed.

FIG. 16*b* shows a cross-sectional view of the valve house 110 in the section around the house body 130 (with the outer ends of the fluid inlet 120 and fluid outlet 140 cut form the drawing). The shown variant of the rotary valve has multiple sealing means in the form of sealing grooves 166 encircling both the inner opening of the fluid inlet 124 and the inner opening of the fluid outlet 144 as well as end sealing grooves 166', 166" at the first 132 and second end of the house body 134. The combination of multiple sealing means works together to minimise the amount of fluid that escapes the intended flow path through the fluid inlet 120, opening channel (not shown), and fluid outlet 140 and to subsequently stop any small amount of fluid that escapes nevertheless such that no fluid leaks outside the fluid valve.

The seal around the inner opening of the fluid inlet 124 and the inner opening of the fluid outlet 142 may be considered the primary seal which is the first seal the fluid encounters and which is to minimise the amount of fluid leaving the intended flow path. The end seals 166', 166" may be considered secondary seals which are to stop any minor amount of fluid which has escaped the intended flow path from leaking out of the rotary valve.

In other variants, the rotary valve of the primary seal, i.e. the seal encircling the inner opening of the fluid inlet 124 and the inner opening of the fluid outlet 142, may be sealing lips 165 present in the valve house 110 in combination with the end sealing grooves 166', 166". In yet other variants of the valve house 110, one of the primary seals may be a sealing lip 165, and the other may be a sealing groove 166. In yet other variants of the valve house only one of the inner opening of the fluid inlet 124 and the inner opening of the fluid outlet 144 will be encircled by a sealing lip 165 or sealing groove 166. The skilled person will understand that in these different variants, the plug 150 will be cast to match having sealing lips 165, where the valve house 110 has sealing grooves 166, and having sealing grooves 166, where the valve house 110 has sealing lips 165.

In FIG. 16*b*, the end sealing grooves 166', 166" are illustrated as having square profiles. In other variants, these profiles may have different shapes such as, but not limited to, rounded corners, half-circles or angled.

FIG. 16*c* shows a plug 150 for the rotary valve, wherein the outer plug wall 160 comprises a primary sealing means surrounding or encircling the end of the opening channel 170. The primary sealing means on the plug may be a sealing lip 165 protruding from the outer plug wall 160 or a sealing groove 166 forming a depression in the outer plug wall 160. In a preferred embodiment of the plug 150, it will comprise sealing means around both ends of the opening channel 170 although only one end can be seen in the perspective of FIG. 16*c*. In a preferred embodiment, the plug 150 will comprise sealing grooves 166 indented in the outer plug wall 160 encircling both ends of the opening channel 170. In other embodiments, the plug 150 may comprise a sealing lip 165 at one end of the opening channel 170 and a sealing groove 166 at the other end of the opening channel 170.

The plug illustrated in FIG. 16*c* is a preferred embodiment in which the plug comprises a combination of primary sealing means with multiple secondary sealing means. The flanges 153, 153' at both ends of the plug are secondary sealing means, as the contact between the flanges and the first 132 and second end of the house body 134 creates seals against leaking. In this preferred embodiment, end sealing lips 165' are protruding from both of the flanges 153, 153' (only the one on 153' is visible in this perspective) on the faces of the flanges 153, 153' contacting the ends of the valve house 132, 134. The end sealing lips 165' are also providing a secondary seal against leaks. Due to the shrinkage of the plug 150 towards the centre of the plug 150, when it is cast by inner moulding, a tight fit is achieved between the plug 150 and valve house 110 both in a radial direction towards the centre point of the plug and in the direction perpendicular to the fluid flow through the opening channel 170, when the rotary valve 100 is in the open configuration, i.e. in the directions H and h as illustrated in FIG. 16d.

The sealing lips 165 protruding from the outer plug wall 160 and/or the inside house wall 136 will cause a pressure that may create a slight change of shape and/or cause a gap between valve house 110 and plug 150, when the rotary valve 100 is in the closed position. However, the secondary sealing means, i.e. the flanges 153, 153' and the end sealing lips 156', 156" protruding from said flanges into the end sealing grooves 166', 166" will ensure that the rotary valve 100 remains leaktight also in the case, where the plug is rotated inside the vale house, where the pressure from the lips on the wall away from the groove may cause a gap before the lip and grooves engage each other so that some amount of fluid enters the space between the valve house 110 and the plug 150.

FIG. 16d shows a cross-sectional view of a preferred embodiment of the rotary valve, wherein there is a combination of a primary seal and secondary seals. The cross-sectional cut is made perpendicular to the intended direction of fluid flow through the open rotary valve, but the valve illustrated in FIG. 16d is in a closed configuration. Hence, the opening channel 170 is cut along its long axis and is blocked by the inside house wall 136. The cut through surfaces of the house body 130 is coloured in light grey to make it more easily distinguishable from the plug 150. Note that the components are not to scale, e.g. the sealing means such as the sealing grooves 166 and the end sealing lip 165', 165" may be of different size and different shape. FIG. 16d is simply an illustration of the concept.

The part of the primary seal visible in FIG. 16d is the sealing grooves 166 in the outer plug wall 160. Sealing grooves 166 surround or encircle both ends of the opening channel 170 thus creating part of a seal around the opening channel contributing to keeping the fluid confined to the intended flow path through the rotary valve, when the rotary valve is in the open configuration. The other part of the primary seal, i.e. the sealing lips protruding from the inside house wall 136 is not visible in this cross section as it is out of view behind the plug 150. However, these sealing lips protruding from the inside house wall 136 will engage the sealing grooves 166 of the outer plug wall 160, when the plug is rotated to the open configuration.

The embodiment of the rotary valve shown in FIG. 16d further has secondary seals in the form of flanges 153, 153' at both ends of the plug 150. The flanges 153, 153, contact the first and second ends of the house body creating a seal against any fluid that might have escaped the intended flow path through the rotary valve. An additional set of secondary end sealing means is present in this embodiment of the invention in the form of end sealing lips 165', 165" protruding from the flanges 153, 153'. These end sealing lips 165', 165" engage end sealing grooves 166', 166" in the end faces of the first 132 and second end of the house body 134. These end sealing lips 165', 165" and end sealing grooves 166', 166" provide yet another sealing point between the plug 150 and valve house contributing to a leaktight seal of the rotary valve thus stopping any fluid which might haw escaped the intended flow path through the rotary valve.

The combination of the two secondary seals, i.e. the flanges 153, 153' and the end sealing means with end sealing lips 166', 166' protruding from the face of the flanges 153, 153" contacting the faces of the first 132 and second end of the house body 134, contributes to a leaktight seal as they provide force between the plug 150 and the house body 130 in different directions. The flange 153' provides a contact force in the direction h against the second end of the house body 134, just as the other flange 153 will provide a parallel force in the opposite direction, i.e. also towards the middle of the structure and parallel to the wall of the house body 130. The end sealing means, i.e. the end sealing lips 165', 165" and end sealing grooves 166', 166" provide a sealing force which is at least in part perpendicular to that of the flanges 153, 153' in the radial direction H. In this way, the two secondary seals compliment each other to create a leaktight seal against fluid. When the rotary valve is manufactured through inner moulding, these forces are increased, as the plug, being the second cast component, shrinks towards the centre of the plug and hence in a direction that is a combination of the directions h and H on one side of the plug and in the mirrored directions on the other side of the plug.

The invention claimed is:

1. A two-component rotary valve (100) for controlling a fluid flow through said rotary valve (100), said rotary valve (100) comprising:
   a valve house (110) comprising a fluid inlet (120), a house body (130), and a fluid outlet (140), said house body (130) being hollow and comprising an inside house wall (136) described by an inner radius (R, R'); and
   a plug (150) comprising a plug tube (152) with an outer plug wall (160) described by an outer radius (T, T), an opening channel (170), and a lever (180), said plug tube (152) being placed at least partially inside said house body (130) such that at least part of said outer plug wall (160) is in contact with said inside house wall (136), said plug (150) being adapted to be rotatable within said house body (110),
   wherein the house body (130) comprises two rotary symmetrical secondary sealing lips disposed on opposite ends of the house body to seal against corresponding sealing grooves formed in the outer plug wall (160), and
   wherein there is at least one rotary position of the plug (150) relative to the valve house (110) for which a contour of the outer plug wall (160) matches a contour of the inside house wall (136).

2. The two-component rotary valve according to claim 1, wherein said plug (150) consists of a single cast piece requiring no assembly.

3. The two-component rotary valve according to claim 1, wherein the rotary valve (100) further comprises at least one primary sealing means.

4. The two-component rotary valve according to claim 1, further comprising one or more sealing lips (165) and/or sealing grooves (166) in the inside house wall, wherein the sealing lips (165) and/or sealing grooves encircle an inner opening of the fluid inlet (124) and an inner opening of the fluid outlet (144), respectively.

5. The two-component rotary valve according to claim 1, wherein said lever (180) of said plug (150) is connected to both of opposite ends of said plug tube (152).

6. A two-component rotary valve (100) for controlling a fluid flow through said rotary valve (100), said rotary valve (100) comprising:
   a valve house (110), said valve house (110) comprising a fluid inlet (120), a house body (130), and a fluid outlet (140), said house body (130) being hollow and comprising an inside house wall (136) described by an inner radius (R, R'); and
   a plug (150), said plug (150) comprising a plug tube (152) with an outer plug wall (160) described by an outer radius (T, T), an opening channel (170), and a lever (180), said plug tube (152) being placed at least partially inside said house body (130) such that at least part of said outer plug wall (160) is in contact with said inside house wall (136), said plug (150) being adapted to be rotatable within said house body (110), said inside house wall (136) comprising multiple sealing means encircling an inner opening of the fluid inlet (124) and an inner opening of the fluid outlet (144), respectively, wherein said plug (150) comprises two flanges (153,153') contacting a first end of the house body (132) and a second end of the house body (134), respectively, and wherein said two flanges (153,153') comprise end sealing lips (165', 165"), said end sealing lips (165', 165") contacting end sealing grooves (166', 166") comprised in the first end of the house body (132) and the second end of the house body (134), respectively.

7. The two-component rotary valve according to claim 6, the house body (130) further comprising an oval transverse sectional area, wherein the oval transverse sectional area is defined by one or more local variations of the inner radius (R) of said house body (130) and corresponding one or more local variations of the outer radius (T) of said plug (150).

8. The two-component rotary valve according to claim 6, the house body (130) comprising at least one conical section further disposed along the inside house wall (136) and outer plug wall (160), wherein the at least one conical section is defined by one or more local variations of the inner radius (R) of said house body (130) and corresponding one or more local variations of the outer radius (T) of said plug (150).

9. A method for creating a two-component rotary valve (100) comprising:
  injection moulding of a first component;
  injection moulding of a second component, wherein the injection moulding of the second component comprises either a form of inner moulding or over moulding, and wherein a surface of the first component contacting a surface of the second component defines a shape of the surface of the second component; and
cooling the first component and the second component of said rotary valve (100) after moulding, wherein cooling the first component and the second component controls a shrinking thereby improving a seal of said rotary valve (100) created by a sealing means between the first component and the second component,
wherein a contact force between the first component and the second component is higher at the sealing means when the sealing means are engaged than away from the sealing means due to the first component and the second component being cast at separate times during production of the rotary valve (100) and thereby having different shrink rates and creating a tight seal.

10. The method for creating the two-component rotary valve according to claim 9, wherein the second component is moulded by injecting a material twice in rapid succession, whereby the shrinking is controlled.

11. The method for creating the two-component rotary valve (100) according to claim 9, further comprising:
  first injection moulding a valve house (110) as one of the first component or the second component; and
  subsequently injection moulding a plug (150) as the other of the first component or the second component inside said valve house (110), whereby said valve house (110) takes part in shaping said plug (150), wherein the shrinking of said plug (150) during the cooling of one or more materials is utilized to improve the seal of said rotary valve (100), as said plug (150) comprises two flanges (153,153') and the shrinking of said plug (150) causes increased force between said two flanges (153, 153') and a first end of a house body (124) and a second end of the house body (144).

\* \* \* \* \*